United States Patent [19]

Lesher et al.

[11] Patent Number: 5,262,203
[45] Date of Patent: * Nov. 16, 1993

[54] METHODS OF PRODUCING CERAMIC AND CERAMIC COMPOSITE BODIES

[75] Inventors: Harold D. Lesher; Ratnesh K. Dwivedi, both of Wilmington, Del.; Perry B. Goldberg, North East, Md.

[73] Assignee: Lanxide Technology Company, LP, Newark, Del.

[*] Notice: The portion of the term of this patent subsequent to Jun. 9, 2009 has been disclaimed.

[21] Appl. No.: 895,294

[22] Filed: Jun. 8, 1992

Related U.S. Application Data

[63] Continuation of Ser. No. 523,110, May 14, 1990, Pat. No. 5,120,580, Continuation-in-part of Ser. No. 376,840, Jul. 7, 1989, abandoned.

[51] Int. Cl.⁵ .................................................. C23C 2/00
[52] U.S. Cl. ............................ 427/383.5; 427/376.2; 427/431
[58] Field of Search ................... 427/383.5, 431, 376.2

[56] References Cited

U.S. PATENT DOCUMENTS

| | | | |
|---|---|---|---|
| 3,824,113 | 7/1974 | Loxley | 427/431 |
| 4,713,360 | 12/1987 | Newkirk | 501/128 |
| 4,818,734 | 4/1989 | Kanter | 501/128 |
| 4,828,785 | 5/1989 | Newkirk | 264/59 |
| 4,830,799 | 5/1989 | LaRoche | 264/60 |
| 4,851,375 | 7/1989 | Newkirk | 501/128 |
| 4,853,352 | 8/1989 | Newkirk | 501/128 |
| 4,859,640 | 8/1989 | Newkirk | 501/127 |
| 4,900,699 | 2/1990 | Newkirk | 501/94 |
| 4,916,113 | 4/1990 | Newkirk | 501/128 |
| 4,918,034 | 4/1990 | Weinstein | 501/128 |
| 4,923,832 | 5/1990 | Newkirk | 501/127 |
| 4,957,779 | 9/1990 | Irick | 427/376.2 |
| 5,017,526 | 5/1991 | Newkirk | 501/89 |
| 5,017,533 | 5/1991 | Newkirk | 501/127 |
| 5,051,382 | 9/1991 | Newkirk | 501/87 |
| 5,086,019 | 2/1992 | Weinstein | 501/94 |
| 5,120,580 | 6/1992 | Lesher | 427/383.5 |

Primary Examiner—Shrive Beck
Assistant Examiner—Vi Duong Dang
Attorney, Agent, or Firm—Mark G. Mortenson; Stanislav Antolin

[57] ABSTRACT

There is disclosed methods for producing self-supporting ceramic matrix and ceramic matrix composite bodies by batch, semi-continuous, and continuous processes utilizing the directed oxidation of a molten parent metal with an oxidant to form an oxidation reaction product which may embed filler material.

20 Claims, 3 Drawing Sheets

METHODS OF PRODUCING CERAMIC AND CERAMIC COMPOSITE BODIES

CROSS-REFERENCE TO RELATED APPLICATION

This is a continuation of copending application Ser. No. 07/523,110 filed on May 14, 1990, U.S. Pat. No. 5,120,580 which is a continuation-in-part application of U.S. application Ser. No. 376,840, filed on Jul. 7, 1989, in the names of Harold Daniel Lesher et al., and entitled "Methods of Producing Ceramic and Ceramic Composite Bodies" now abandoned.

FIELD OF THE INVENTION

This invention relates to methods of producing self-supporting ceramic matrix and ceramic matrix composite bodies by batch, semi-continuous, and continuous processes.

BACKGROUND OF THE INVENTION AND DISCUSSION OF COMMONLY OWNED PATENTS AND PATENT APPLICATIONS

In recent years, there has been an increasing interest in the use of ceramics for structural applications historically served by metals. The impetus for this interest has been the superiority of ceramics with respect to certain properties, such as corrosion resistance, hardness, modulus of elasticity, and refractory capabilities, when compared with metals.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises two or more different materials which are intimately combined in order to attain desired properties of the composite. For example, two different materials may be intimately combined by embedding one in a matrix of the other. A ceramic matrix composite structure typically comprises a ceramic matrix which incorporates one or more diverse types of filler materials such as particulates, fibers, rods, and the like.

There are several known limitations or difficulties in substituting ceramics for metals, such as scaling versatility, capability to produce complex shapes, satisfying the properties required for the end use application, and costs. Several copending patent applications, and issued patents, assigned to the same owner as this application (hereinafter sometimes referred to as "Commonly Owned Patent Applications and Patents"), overcome these limitations or difficulties and provide novel methods for reliably producing ceramic materials, including composites. The method is disclosed generically in Commonly Owned U.S. Pat. No. 4,713,360, issued on Dec. 15, 1987, in the names of Marc S. Newkirk et al and entitled "Novel Ceramic Materials and Methods for Making Same". This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce alpha-alumina ceramic structures. This method was improved upon by the application of dopant materials to the surface of the parent metal, as described in Commonly Owned U.S. Pat. No. 4,853,352, which issued on Aug. 1, 1989, from U.S. patent application Ser. No. 220,935, filed Jun. 23, 1988, which was a continuation-in-part of U.S. application Ser. No. 822,999, filed Jan. 27, 1986 (and now abandoned), which was a continuation-in-part of U.S. application Ser. No. 776,965, filed Sep. 17, 1985 (and now abandoned), which was a continuation-in-part of U.S. application Ser. No. 747,788, filed Jun. 25, 1985 (and now abandoned), which was a continuation-in-part of U.S. application Ser. No. 632,636, filed Jul. 20, 1984 (and now abandoned), all in the names of Marc S. Newkirk et al and entitled "Methods of Making Self-Supporting Ceramic Materials". Above-mentioned U.S. application Ser. No. 747,788, corresponds to European Patent Application No. 85305107.6, which was published on Jan. 22, 1986, as European Patent Application Publication No. 0169067.

A similar oxidation phenomenon was utilized to grow oxidation reaction product into a filler material to produce ceramic composite bodies, as described in Commonly Owned U.S. patent application Ser. No. 265,835, filed Nov. 1, 1988, now U.S. Pat. No. 4,916,113, which issued on Apr. 10, 1990, and which was a continuation of U.S. application Ser. No. 819,397, now U.S. Pat. No. 4,851,375, which issued on Jul. 25, 1989, and was a continuation-in-part of U.S. application Ser. No. 697,876, filed Feb. 4, 1985 (and now abandoned). All of the patent applications and patents mentioned in this paragraph were filed in the names of Marc S. Newkirk et al. and were entitled "Composite Ceramic Articles and Methods of Making Same". However, U.S. Pat. No. 4,851,375, issued with the title "Methods of Making Composite Ceramic Articles Having Embedded Filler", and U.S. Pat. No. 4,916,113, issued with the title "Methods of Making Composite Ceramic Articles". Above-mentioned U.S. application Ser. No. 819,397, corresponds to European Patent Application No. 86300739.9, which was published on Sep. 3, 1986, as European Patent Application Publication No. 0193292. The patent applications and patents, described immediately above, disclose novel methods for producing a self-supporting ceramic composite by growing an oxidation reaction product from a parent metal into a permeable mass of filler, (e.g., a silicon carbide particulate filler) thereby infiltrating the filler with a ceramic matrix. The resulting composite, however, has no defined or predetermined geometry, shape, or configuration.

A method for producing ceramic composite bodies having a predetermined geometry or shape is disclosed in Commonly Owned and Copending U.S. patent application Ser. No. 338,471, filed Apr. 14, 1989, now U.S. Pat. No. 5,017,526, which issued on May 21, 1991, which is a continuation of U.S. application Ser. No. 861,025, filed May 8, 1986 (and now abandoned), both in the names of Marc S. Newkirk et al. In accordance with the method in this U.S. patent application, the developing oxidation reaction product infiltrates a permeable preform of filler material (e.g., a silicon carbide preform material) in a direction towards a defined surface boundary. Above-mentioned U.S. application Ser.

No. 861,025, corresponds to European Patent Application No. 87630075.7, which was published on Nov. 11, 1987, as European Patent Application Publication No. 0245192.

It was discovered that high shape fidelity is more readily achieved by providing the preform with a barrier means, as disclosed in Commonly Owned U.S. patent application Ser. No. 295,488, filed Jan. 10, 1989, which is a continuation of U.S. patent application Ser. No. 861,024, filed May 8, 1986, now U.S. Pat. No. 4,923,832, which issued on May 8, 1990, all in the names of Marc S. Newkirk et al. This method produces shaped self-supporting ceramic bodies, including shaped ceramic composites, by growing the oxidation reaction product of a parent metal to a barrier means spaced from the metal for establishing a boundary or surface. Abovementioned U.S. application Ser. No. 861,024, corresponds to European Patent Application No. 87630076.5, which was published on Nov. 11, 1987, as European Patent Application Publication No. 0245193.

Ceramic composite bodies having a cavity with an interior geometry inversely replicating the shape of a positive mold or pattern are disclosed in Commonly Owned U.S. patent application Ser. No. 329,794, filed Mar. 28, 1989, U.S. Pat. No. 5,051,382 which is a divisional of U.S. patent application Ser. No. 823,542, filed Jan. 27, 1986, now U.S. Pat. No. 4,828,785, which issued May 9, 1989, all in the names of Marc S. Newkirk, et al, and in Commonly Owned U.S. Pat. No. 4,859,640, which issued on Aug. 22, 1989, from U.S. patent application Ser. No. 896,157, filed Aug. 13, 1986, in the name of Marc S. Newkirk. Above-mentioned U.S. application Ser. No. 823,542, corresponds to European Patent Application No. 87300409.7, which was published on Sep. 2, 1987, as European Patent Application Publication No. 0234704. Above-mentioned U.S. application Ser. No. 896,157, corresponds to European Patent Application No. 87630109.4, which was published on Mar. 9, 1988, as European Patent Application Publication No. 0259239.

A technique whereby additional molten parent metal is supplied from a reservoir to the initial body of molten metal is disclosed in Copending and Commonly Owned U.S. patent application Ser. No. 478,845, filed Feb. 12, 1990, U.S. Pat. No. 5,086,014 as a continuation of U.S. patent application Ser. No. 168,358, filed Mar. 15, 1988, now U.S. Pat. No. 4,918,034, which issued on Apr. 17, 1990, and which was a continuation-in-part of U.S. patent application Ser. No. 908,067, filed Sep. 16, 1986, now U.S. Pat. No. 4,900,699, which issued on Feb. 13, 1990. All of the patent applications and patents described in this paragraph were entitled "Reservoir Feed Method of Making Ceramic Composite Structures and Structures Made Thereby". U.S. patent applications Ser. Nos. 478,845 and 168,358, were both filed in the names of Weinstein et al. U.S. patent application Ser. No. 908,067, was filed in the names of Newkirk et al. Above-mentioned U.S. application Ser. No. 908,067, corresponds to European Patent Application No. 87630176.3, which was published on Mar. 30, 1988, as European Patent Application Publication No. 0262075. The reservoir feed method, discussed above, has been successfully applied to form ceramic matrix or ceramic matrix composite structures. According to the method of this invention, the ceramic matrix or ceramic matrix composite body which is produced comprises a self-supporting ceramic matrix composite structure which includes a ceramic matrix obtained by the oxidation reaction of a parent metal with an oxidant to form a polycrystalline material. In the embodiment of the process whereby a ceramic matrix composite body is produced, a body of the parent metal and a permeable mass or preform of filler material are oriented relative to each other so that formation of the oxidation reaction product will occur in a direction toward and into the filler material. The parent metal is described as being present as a first source and as a reservoir, the reservoir of metal communicating with the first source due to, for example, gravity flow. The first source of molten parent metal reacts with the oxidant to begin the formation of the oxidation reaction product. As the first source of molten parent metal is consumed, it is replenished, preferably by a continuous means, from the reservoir of parent metal. This replenishment of the first source of parent metal continues as the growth of oxidation reaction product infiltrates the filler material. Thus, the reservoir assures that ample parent metal will be available to continue the process until the oxidation reaction product has grown to a desired extent.

A method for tailoring the constituency of the metallic component of a ceramic matrix composite structure is disclosed in Copending and Commonly Owned U.S. patent application Ser. No. 269,152, filed Nov. 9, 1988, now abandoned in the names of Robert C. Kantner et al. and entitled "Method for in situ Tailoring the Metallic Component of Ceramic Articles and Articles Made Thereby", which is a continuation of Comonly Owned U.S. patent application Ser. No. 152,518 filed on Feb. 5, 1988, in the same names and having the same title; which was a continuation-in-part of U.S. patent application Ser. No. 908,454 (now abandoned), filed Sep. 17, 1986, in the names of Marc S. Newkirk et al. and having the same title. U.S. patent application Ser. No. 152,518, issued on Apr. 4, 1989, as U.S. Pat. No. 4,818,734, and was entitled "Method For In Situ Tailoring The Metallic Component of Ceramic Articles". Finally, U.S. application Ser. No. 389,506, was filed on Aug. 2, 1989, U.S. Pat. No. 5,017,533 in the names of Marc S. Newkirk et al., as a continuation of U.S. application Ser. No. 908,454, now abandoned and was entitled "Method for In Situ Tailoring the Metallic Component of Ceramic Articles and Articles Made Thereby". Above-mentioned U.S. application Ser. No. 908,454, corresponds to European Patent Application No. 87630161.5, which was published on Apr. 6, 1988, as European Patent Application Publication No. 0263051. Each of these applications and Patent discloses a method for tailoring the constituency of the metallic component (both isolated and interconnected) of ceramic matrix and ceramic matrix composite bodies during formation thereof to impart one or more desirable characteristics to the resulting body. Thus, desired performance characteristics for the final ceramic matrix or ceramic matrix composite body are advantageously achieved by incorporating the desired metallic component in situ, rather than from an extrinsic source, or by post-forming techniques.

As discussed in these Commonly Owned Patent Applications and Patents, novel polycrystalline ceramic matrix materials or polycrystalline ceramic matrix composite materials are produced by the oxidation reaction between a parent metal and an oxidant which may be a solid, liquid and/or a gas. In accordance with the generic process disclosed in these Commonly Owned Patent Applications and Patents, a parent metal (e.g., aluminum) is heated to an elevated temperature above its melting point but below the melting point of the oxidation reaction product to form a body of molten parent metal which reacts upon contact with an oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product upon contact with the oxidant, at the surface of the previously formed oxidation reaction product. As the process continues, additional metal is transported through this formation of polycrystalline oxidation reaction product thereby continually "growing" a ceramic structure of interconnected crystallites. The resulting ceramic matrix body may contain metallic constituents, such as non-oxidized constituents of the parent metal, and/or voids. Oxidation is used in its broad sense in all of the Commonly Owned Patent Applications and Patents discussed in this application, and refers to the loss, or sharing, of electrons by a metal to, or with, an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and air as the oxidant, dopants such as magnesium and silicon, to name but two of a larger class of dopant materials, can be alloyed with aluminum, and the created growth alloy is utilized as the parent metal. The resulting oxidation reaction product of such a growth alloy comprises alumina, typically alpha-alumina.

Novel ceramic matrix composite structures and methods of making the same are also disclosed and claimed in certain of the aforesaid Comonly Owned Patent Applications and Patents which utilize the oxidation reaction to produce ceramic matrix composite structures comprising a substantially inert filler (note: in some cases it may be desirable to use a reactive filler, e.g., a filler which is at least partially reactive with the advancing oxidation reaction product and/or parent metal) which is infiltrated by and embedded in the polycrystalline ceramic matrix. As a first step, a parent metal is positioned adjacent to a permeable mass of filler material which can be shaped and/or treated to be a self-supporting preform. The parent metal is then heated to form a body of molten parent metal which is reacted with an oxidant, as described above, to form an oxidation reaction product. As the oxidation reaction product grows and infiltrates the adjacent mass of filler material, molten parent metal is drawn through the previously formed oxidation reaction product within the mass of filler material and reacts with the oxidant to form additional fresh oxidation reaction product at the surface of the previously formed oxidation reaction product, as described above. The resulting growth of oxidation reaction product infiltrates or embeds the filler material and results in the formation of a ceramic matrix composite structure comprising a polycrystalline ceramic matrix embedding the filler material. As also discussed above, the mass of filler material (or preform) may utilize a barrier means to establish a boundary or surface for the ceramic matrix composite structure.

Thus, the aforesaid Commonly Owned Patent Applications and Patents describe the production of ceramic matrix and ceramic matrix composite bodies comprising oxidation reaction products which are readily grown to desired sizes and thicknesses heretofore believed to be difficult, if not impossible, to achieve with conventional ceramic processing techniques.

The entire disclosures of all of the foregoing Commonly Owned Patent Applications and Patents are expressly incorporated herein by reference.

SUMMARY OF THE INVENTION

The present invention relates to techniques whereby ceramic matrix and ceramic matrix composite bodies may be produced in a continuous or semi-continuous manner. Generally, these techniques involve the growth of an oxidation reaction product formed by the reaction of a molten parent metal with an oxidant. In a preferred embodiment of the invention, the formed body comprises a ceramic matrix composite body which is manufactured by growing an oxidation reaction product into a body of filler material, the body of filler material being configured in either an unbonded mass or as a preform. The oxidation reaction product comprises the product of an oxidation reaction of a molten parent metal (e.g., aluminum) with an oxidant. Specifically, the body of filler material is positioned adjacent to a source of parent metal such that formation of an oxidation reaction product of the parent metal will occur in a direction towards an oxidant (e.g., a solid, liquid and/or a vapor oxidant) and into the body of filler material. Moreover, a barrier means can be used in combination with the body of filler material, the barrier means being capable of locally inhibiting, poisoning, stopping, interfering with, preventing or the like, continued growth of the oxidation reaction product. Typically, the parent metal is heated to a temperature above its melting point, but below the melting point of its oxidation reaction product, to form a body of molten metal. At this temperature, or within this temperature range, the molten metal reacts with the oxidant to form the oxidation reaction product. At least a portion of the oxidation reaction product is maintained in contact with and between the molten metal and the oxidant to draw molten metal through the oxidation reaction product towards and into contact with the oxidant such that fresh oxidation reaction product continues to form at an interface between the oxidant and previously formed oxidation reaction product, thus allowing the growth of oxidation reaction product to infiltrate the adjacent body of filler material. The reaction is continued for a time sufficient to infiltrate at least a portion of the body of filler material with a polycrystalline material consisting essentially of the oxidation reaction product of the parent metal and, optionally, at least one non-oxidized metallic constituent which is dispersed or distributed throughout the polycrystalline material. The body of filler material should be sufficiently permeable to permit or accommodate growth of the oxidation reaction product within the body of filler material, and to permit the gaseous oxidant (if a gaseous oxidant is used) to permeate the body of filler material and contact the molten parent metal. It should be understood that the polycrystalline matrix material may exhibit voids or porosity in place of the metallic constituent, but the volume percent of voids will depend largely on such conditions as temperature, time, dopants, and type of parent metal. If a barrier means is used, the ceramic matrix composite body will continue to grow to the barrier means, provided that sufficient parent metal is present to permit such growth.

The methods of the instant invention utilize the methods of forming ceramic matrix and ceramic matrix composite bodies, described above. Specifically, the methods of the instant invention are directed to producing the above-described ceramic matrix or ceramic matrix composite bodies in quantity through the utilization of continuous, semi-continuous or batch production techniques in combination with the above-described techniques for forming ceramic matrix or ceramic matrix composite bodies.

In a preferred embodiment of the instant invention, a production technique is utilized whereby at least one preform is floated on the surface of a molten pool of parent metal until the preform has been at least partially embedded by an oxidation reaction product of the parent metal and an oxidant. Once the preform has been at least partially embedded by the oxidation reaction product, the oxidation reaction is terminated by either: (1) removing the infiltrated preform from contact with the molten metal; (2) altering the environment in such a way that the oxidation reaction cannot continue, e.g., removing the oxidant; or (3) contacting the growth of oxidation reaction product with a barrier material.

DEFINITIONS

As used herein in the specification and the appended claims, the terms below are defined as follows:

"Alloy Side", as used herein, refers to that side of the final ceramic matrix composite which corresponds to the side of the body of filler material which initially contacted molten metal before the oxidation reaction product of that molten metal and an oxidant infiltrated the body of filler material to form the final ceramic matrix composite.

"Aluminum", etc., as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Barrier" or "barrier means", as used herein, may be any material, compound, element, composition, or the like, which, under the process conditions, maintains some integrity, is not substantially volatile (i.e., the barrier material does not volatilize to such an extent that it is rendered non-functional as a barrier) and is preferably permeable to a vapor-phase oxidant (if utilized) while being capable of locally inhibiting, poisoning, stopping, interfering with, preventing, or the like, continued growth of the oxidation reaction product.

"Carcass" or "Parent Metal Carcass", as used herein, refers to any of the original body of parent metal remaining which has not been consumed during formation of the ceramic matrix or ceramic matrix composite body and typically, which remains in at least partial contact with the formed body. It should be understood that the carcass may also typically include some oxidized constituents of the parent metal and/or a second or foreign metal therein.

"Ceramic", as used herein, should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body) derived from the parent metal, or reduced from the oxidant or a dopant, most typically within a range of from about 1–40 percent by volume, but may include still more metal.

"Ceramic Composite Body" or "Ceramic Matrix Composite", as used herein, means any ceramic matrix embedding a filler material.

"Dopants", as used herein, means materials (alloy constituents or constituents combined with and/or included in and/or in or on a filler) which, when used in combination with the parent metal, favorably influence or promote the oxidation reaction process and/or modify the growth process to alter the microstructure and/or properties of the product. While not wishing to be bound by any particular theory or explanation of the function of dopants, it appears that some dopants are useful in promoting oxidation reaction product formation in cases where appropriate surface energy relationships between the parent metal and its oxidation reaction product do not intrinsically exist so as to promote such foreation. Dopants may:

(1) create favorable surface energy relationships which enhance or induce the wetting of the oxidation reaction product by the molten parent metal;

(2) form a "precursor layer" at the growth surface by reaction with alloy, oxidant, and/or filler, that (a) minimizes formation of a protective and coherent oxidation reaction product layer(s), (b) may enhance oxidant solubility (and thus permeability) in molten metal, and/or (c) allows for transport of oxidant from the oxidizing atmosphere through any precursor oxide layer to combine subsequently with the molten metal to form another oxidation reaction product;

(3) cause microstructural modifications of the oxidation reaction product as it is formed, or subsequently alter the metallic constituent composition and properties of such oxidation reaction product; and/or (4) enhance growth nucleation and uniformity of growth of oxidation reaction product.

"Filler", as used herein, is intended to include either single constituents or mixtures of constituents which are substantially non-reactive with and/or of limited solubility in the metal (e.g., parent metal) and/or oxidation reaction product and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum parent metal. Fillers may also include metals.

"Growth Alloy", as used herein, means any alloy which (1) contains initially, or (2) obtains at some point during processing, a sufficient amount of requisite constituents to result in growth of oxidation reaction product therefrom.

"Liquid-Phase Oxidant" or "Liquid Oxidant", as used herein, means an oxidant in which the identified liquid is the sole, predominant or at least a significant oxidizer of the parent or precursor metal under the conditions of the process.

Reference to a liquid oxidant means one which is a liquid under the oxidation reaction conditions. Accordingly, a liquid oxidant may have a solid precursor, such as a salt, which is molten at the oxidation reaction conditions. Alternatively, the liquid oxidant may have a liquid precursor (e.g., a solution of a material) which is used to impregnate part or all of the filler and which is melted or decomposed at the oxidation reaction conditions to provide a suitable oxidant moiety. Examples of liquid oxidants as herein defined include low melting glasses.

If a liquid oxidant is employed in conjunction with the parent metal and a filler, typically, the entire bed of filler, or that portion comprising the desired ceramic matrix composite body, is impregnated with the oxidant (e.g., by coating or immersion in the oxidant).

"Nitrogen-Containing Gas Oxidant", as used herein, means a particular gas or vapor in which nitrogen is the sole, predominant or at least a significant oxidizer of the parent or precursor metal under the conditions existing in the oxidizing environment utilized.

"Oxidant", as used herein, means one or more suitable electron acceptors or electron sharers and may be a solid, a liquid or a gas or some combination of these (e.g., a solid and a gas) at the oxidation reaction conditions. Typical oxidants include, without limitation, oxygen, nitrogen, a halogen, sulphur, phosphorus, arsenic, carbon, boron, selenium, tellurium, and or compounds and combinations thereof, for example, silica or silicates (as a source of oxygen), methane, ethane, propane, acetylene, ethylene, propylene (the hydrocarbon as a source of carbon), and mixtures such as air, $H_2/H_2O$ and $CO/CO_2$ (source of oxygen), the latter two (i.e., $H_2/H_2O$ and $CO/CO_2$) being useful in reducing the oxygen activity of the environment.

"Oxidation Reaction Product", as used herein, means one or more metals in any oxidized state wherein the metal(s) has given up electrons to or shared electrons with another element, compound, or combination thereof. Accordingly, an "oxidation reaction product" under this definition includes the product of reaction of one or more metals with one or more oxidants.

"Oxygen-Containing Gas Oxidant", as used herein, means a particular gas or vapor in which oxygen is the sole, predominant or at least a significant oxidizer of the parent or precursor metal under the conditions existing in the oxidizing environment utilized.

"Parent Metal", as used herein, means that metal(s) (e.g., aluminum, silicon, titanium, tin, hafnium and/or zirconium) which is the precursor of a polycrystalline oxidation reaction product and includes that metal(s) as an essentially pure metal, a commercially available metal having impurities and/or alloying constituents therein, or an alloy in which that metal precursor is the major constituent. When a specified metal is mentioned as the parent or precursor metal (e.g., aluminum, etc.), the metal identified should be read with this definition in mind unless indicated otherwise by the context.

A Metal "Different" from the parent metal means a metal which does not contain, as a primary constituent, the same metal as the parent metal (e.g., if the primary constituent of the parent metal is aluminum, the "different" metal could have a primary constituent of, for example, nickel).

"Preform" or "Permeable Preform", as used herein, means a porous mass of filler or filler material which is manufactured with at least one surface boundary which essentially defines a boundary for growing oxidation reaction product, such mass retaining sufficient shape integrity and green strength to provide dimensional fidelity prior to being infiltrated by the growing ceramic matrix. This mass is: (1) sufficiently porous to permit the vapor-phase oxidant (if a vapor-phase oxidant is used) to permeate the preform and contact parent metal, and (2) sufficiently permeable to accommodate development or growth of oxidation reaction product. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reactive Filler", as used herein, means a filler which interacts with molten parent metal (e.g., is reduced by the parent metal and/or oxidation reaction product and thus modifies the composition of the parent metal and/or provides an oxidant for formation of the oxidation reaction product).

"Reservoir", as used herein, means a separate body of parent metal positioned relative to a mass of filler or a preform so that, when the metal is molten, it may flow to replenish, or in some cases to initially provide and subsequently replenish, that portion, segment or source of parent metal which is in contact with the filler or preform and infiltrating and/or reacting to form the oxidation reaction product.

"Second or Foreign Metal", as used herein, means any suitable metal, combination of metals, alloys, intermetallic compounds, or sources of either, which is, or is desired to be, incorporated into the metallic component of a formed ceramic matrix or ceramic matrix composite body in lieu of, in addition to, or in combination with unoxidized constituents of the parent metal. This definition includes intermetallic compounds, alloys, solid solutions or the like formed between the parent metal and a second metal.

"Solid-Phase Oxidant" or "Solid Oxidant", as used herein, means an oxidant in which the identified solid is the sole, predominant or at least a significant oxidizer of the parent or precursor metal under the conditions of the process.

When a solid oxidant is employed in conjunction with the parent metal and a filler, it is usually dispersed throughout the entire bed of filler or that portion of the bed into which the oxidation reaction product will grow, the solid oxidant being, for example, particulates admixed with the filler or coatings on the filler particles. Any suitable solid oxidant may be thus employed including elements, such as boron or carbon, or reducible compounds, such as silicon dioxide or certain borides of lower thermodynamic stability than the boride reaction product of the parent metal. For example, when boron or a reducible boride is used as a solid oxidant for an aluminum parent metal, the resulting oxidation reaction product comprises aluminum boride.

In some instances, the oxidation reaction of the parent metal may proceed so rapidly with a solid oxidant that the oxidation reaction product tends to fuse due to the exothermic nature of the process. This occurrence can degrade the microstructural uniformity of the ceramic matrix body. This rapid exothermic reaction can be ameliorated by mixing into the composition relatively inert fillers which absorb the excess heat. An example of such a suitable inert filler is one which is identical, or substantially identical, to the intended oxidation reaction product.

"Vapor-Phase Oxidant", as used herein, means that the oxidant contains or comprises a particular gas or vapor and further means an oxidant in which the identified gas or vapor is the sole, predominant or at least a significant oxidizer of the parent or precursor metal under the conditions obtained in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "Oxygen-Containing Gas Oxidant" but not within the definition of a "Nitrogen-Containing Gas Oxidant" (an example of a "nitrogen-containing gas" oxidant is forming gas, which typically contains about 96 volume percent nitrogen and about 4 volume percent hydrogen).

DETAILED DESCRIPTION OF THE INVENTION AND PREFERRED EMBODIMENTS

Figure 1:
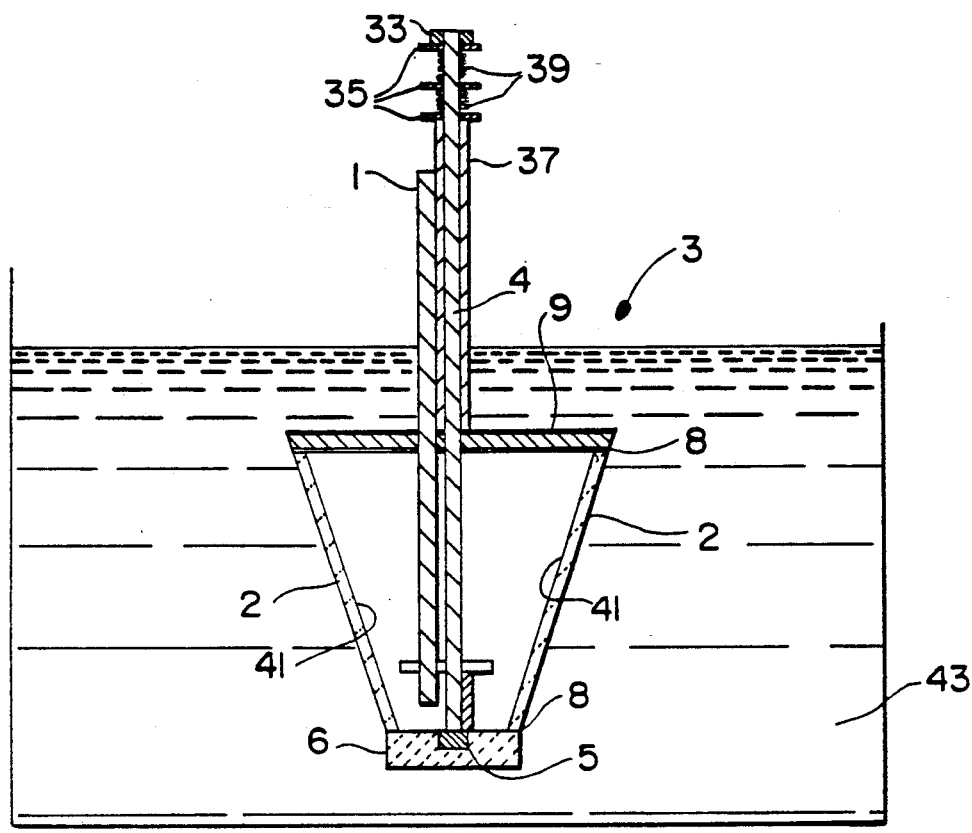
FIG. 1 is a cross-sectional view of a setup utilized in the immersion embodiment of the instant invention wherein a vapor-phase oxidant is utilized.

The present invention relates to methods of continuously, or semi-continuously, producing ceramic matrix or ceramic matrix composite bodies. The ceramic matrix bodies of the instant invention are formed by reacting a body of molten parent metal with an oxidant to form a body of oxidation reaction product. The ceramic matrix composite bodies of the instant invention are produced by reacting a body of molten parent metal with an oxidant to form an oxidation reaction product which at least partially embeds (i.e., grows into) at least one filler material.

Generally, to form a ceramic matrix composite body, which is the preferred product of the present invention, a parent metal (e.g., the growth alloy) is formed into an ingot, billet, rod, plate or the like and is placed into or is contained within an inert bed, crucible or other refractory container. The parent metal, which may be doped as explained below in greater detail, is the precursor to the oxidation reaction product. Moreover, the parent metal may comprise one or more pieces, ingots or the like and may be suitably shaped by any appropriate means. A permeable mass of filler material, or, in a preferred embodiment, a permeable, shaped preform (described below in greater detail) is manufactured so as to have at least one defined surface boundary and to be permeable to a vapor-phase oxidant, when such a vapor-phase oxidant is used alone or in combination with another oxidant, and to be permeable to the growing oxidation reaction product. In one embodiment of the present invention, the preform is placed adjacent to, and preferably in contact with, at least one surface of, or a portion of a surface of, the parent metal such that at least a portion of the defined surface boundary of the preform is generally positioned distantly, or outwardly spaced apart, from the surface of the parent metal. The preform preferably is in contact with an areal surface of the parent metal; but when desired, the preform may be partially or substantially completely immersed, but not totally immersed, in the molten metal. Total immersion would cut-off or block access of the vapor-phase oxidant into the preform and thus inhibit proper development of the oxidation reaction product which embeds the preform. However, if the preform is supplied with a vapor-phase oxidant through an external means, such as through a hollow tube of refractory material, then total immersion of the preform becomes a viable alternative. Further, when a vapor-phase oxidant is not used (i.e., the only oxidant used at the process conditions is a solid oxidant and/or a liquid oxidant), then total immersion of the preform in molten parent metal is also a viable alternative. Formation of the oxidation reaction product will occur in a direction towards the defined surface boundary. At some point during the process the parent metal and permeable preform are, either collectively or individually, placed into a suitable container and inserted into a furnace. The atmosphere in the furnace may contain an oxidant to permit vapor-phase oxidation of molten parent metal to occur. The furnace may be preheated to the processing temperature or may be heated to the processing temperature while containing the setup of parent metal and permeable preform.

In one embodiment of the present invention the body of molten parent metal (e.g., the growth alloy) is held within a container so as to form a pool of molten parent metal. Permeable preforms are placed onto the surface of the pool of molten parent metal (this embodiment is hereinafter sometimes referred to as the "flotation" embodiment). In the flotation embodiment, the preforms are caused to float (due to their natural buoyancy or due to the use of an external means) on the surface of the molten pool of parent metal. If a vapor-phase oxidant is utilized, the molten parent metal will react with the vapor-phase oxidant to form an oxidation reaction product which grows into the preforms to produce ceramic matrix composite bodies.

One technique for utilizing the flotation embodiment is a batch process in which: (1) at least one preform is placed on the surface of a molten pool of parent metal; (2) the preform is then at least partially embedded by the growing oxidation reaction product of the molten parent metal and an oxidant to form a ceramic matrix composite body comprising a matrix of oxidation reaction product embedding the preform material, and (3) after a desired amount of growth has been achieved, the ceramic matrix composite body is removed from the pool of molten parent metal. After the ceramic matrix composite body is removed from the molten pool of parent metal, the molten pool of parent metal is drained and the process is repeated using a fresh pool of parent metal.

Figure 3:
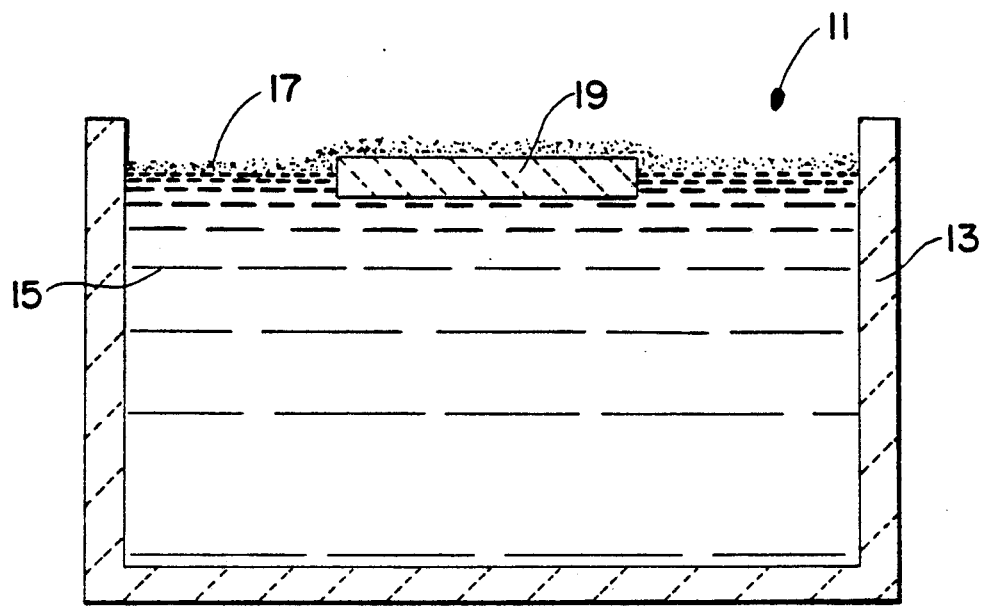
FIG. 3 is a cross-sectional view of a setup utilized in the flotation embodiment of the instant invention.

FIG. 3 displays a cross-section of a standard setup (11) for the batch process technique of the flotation embodiment. As shown in FIG. 3, a preform (19) floats on the surface of a molten pool of parent metal (15) which is held within a container (13). The surfaces of the molten pool of parent metal (15) and the preform (19) which are exposed to the surrounding atmosphere are covered with a thin layer (17) of a material which prevents or inhibits reaction between the surrounding atmosphere and the molten parent metal. However, the layer (17) does not prevent the atmosphere from contacting the preform (19), thus allowing oxidation reaction product to grow into and at least partially embed the preform (19).

Figure 4:
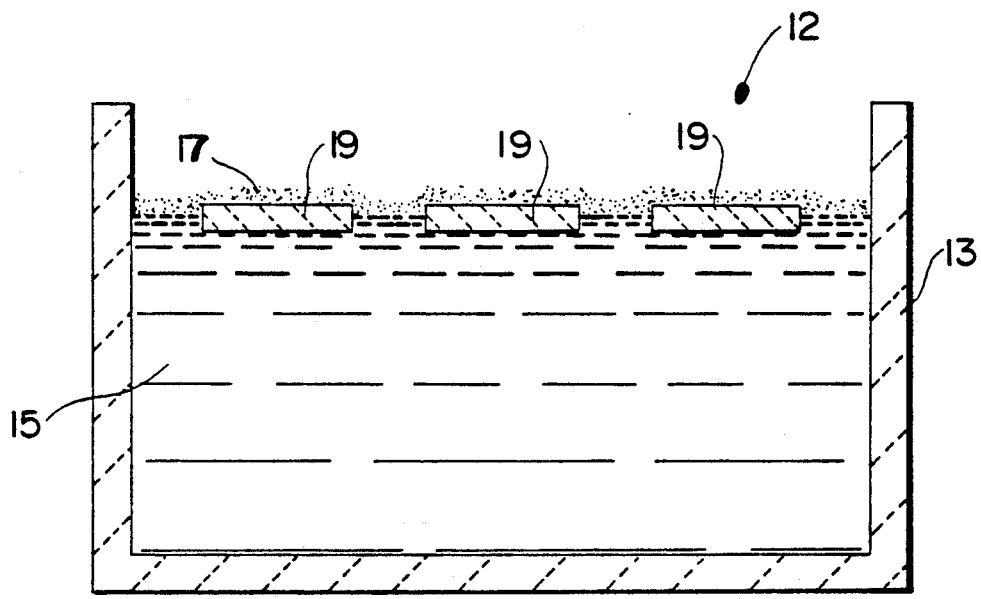
FIG. 4 is a cross-sectional view of a setup utilized in the flotation embodiment of the instant invention wherein multiple preforms are utilized.

FIG. 4 displays a cross-section of a setup (12) for the batch process technique of the flotation embodiment which can be used to produce multiple ceramic matrix composite bodies per batch. As shown in FIG. 4, multiple preforms (19) are floated on the surface of a molten pool of parent metal (15) which is held within a container (13). The surfaces of the molten pool of parent metal (15) and the preforms (19) which are exposed to the surrounding atmosphere are covered with a thin layer (17) of a material which prevents or inhibits reaction between the surrounding atmosphere and the molten parent metal. However, the layer (17) does not prevent the atmosphere from contacting the preforms (19), thus allowing oxidation reaction product to grow into and at least partially embed the preforms (19).

The flotation embodiment of the instant invention, described above, may also be operated as a semi-continuous process. This can be accomplished by using the original pool of molten parent metal to grow oxidation reaction product into several sets of preforms. For example, after the first set of preforms has been at least partially embedded by the growing oxidation reaction product, the resulting ceramic matrix composite bodies would be removed from the pool of molten parent metal and replaced with a fresh (uninfiltrated) set of preforms. After this second set of preforms was at least partially embedded by growing oxidation reaction product, the second set would be removed from the molten pool of parent metal and replaced with a third set of preforms, etc. This process could continue indefinitely until either the molten pool of parent metal was exhausted, or until the concentrations of certain constituents of the parent metal became too small or too large to permit the desired growth of oxidation reaction product.

The flotation embodiment described in the preceding paragraphs can also be adapted to accommodate the continuous production of ceramic matrix composite bodies. This can be accomplished by providing a means for moving the preforms on or across the surface of the molten pool of parent metal. For example, continuous production could be achieved by: (1) placing fresh preforms on the surface of the molten pool of parent metal at a first point, preferably at one end of the molten pool of parent metal, so that at least a portion of the preform is in contact with the molten pool of parent metal; (2) moving the preforms by any suitable means across the surface of the molten pool of parent metal to a second point, preferably the opposite end of the molten pool of parent metal, and causing the oxidation reaction product of the parent metal and the vapor-phase oxidant to grow into and embed the preforms as the preforms are being moved across the surface of the molten pool of parent metal; and (3) removing the embedded preforms from the molten pool of parent metal at the second point. The means for moving the preforms could be calibrated so as to move a particular preform from the first point on the surface of the molten pool of parent metal to the second point in an amount of time which corresponds to the amount of time necessary to achieve the desired extent of growth of oxidation reaction product into the preform. Thus, by continuously feeding fresh preforms onto the surface of a molten pool of parent metal at one point, and removing the infiltrated preforms from the molten pool of parent metal at a second point after a calculated amount of time has elapsed, a continuous process can be achieved. Alternatively, visual observation could be used to examine whether a preform has been embedded to a desired extent by growing oxidation reaction product (e.g., the preform may sink into the pool of molten parent metal as the oxidation reaction product grows into the preform, and thus the amount of the preform remaining above the surface of the molten pool of parent metal could be used to gauge the extent of oxidation reaction product growth into the preform). It should be noted that the concentration of certain constituents in the molten pool of parent metal may need to be increased or decreased during the continuous process. This may be necessary because certain constituents of the parent metal may be consumed at a rate which is different from the rate of consumption of other constituents. The concentrations of the various constituents can be monitored by, for example, using sensors or continuous sampling techniques. When it becomes necessary to increase or decrease the concentration of certain constituents of the parent metal, any convenient means may be utilized, such as the direct addition of one or more constituents or the addition of elements or compounds which react with certain constituents to increase or decrease the concentration of those constituents.

It should be noted that the batch, semi-continuous, and continuous methods of utilizing the flotation embodiment are not limited to the utilization of a vapor-phase oxidant. Any combination of solid oxidants and/or liquid oxidants and/or vapor-phase oxidants, may also be used in this embodiment.

In another embodiment of the instant invention the preforms, either initially or at some point during the growth process, may tend to sink below the surface of the molten pool of parent metal. When such sinking occurs, a means may be provided which prevents the preforms from sinking completely below the surface of the molten pool of parent metal. For example, a support system may be provided which maintains at least a portion of the preform above the surface of the molten pool of parent metal. For example, a support system comprising a screen or a set of pegs made of a material which does not substantially degrade or adversely affect the growth of oxidation reaction product at the temperatures utilized in the instant process, could be placed below the preforms so that contact between the preforms and the support system permits at least a portion of each preform to remain above the surface of the molten pool of parent metal. In the continuous process method, the support system may be mounted on the means for moving the preforms across the molten pool of parent metal.

Figure 5:
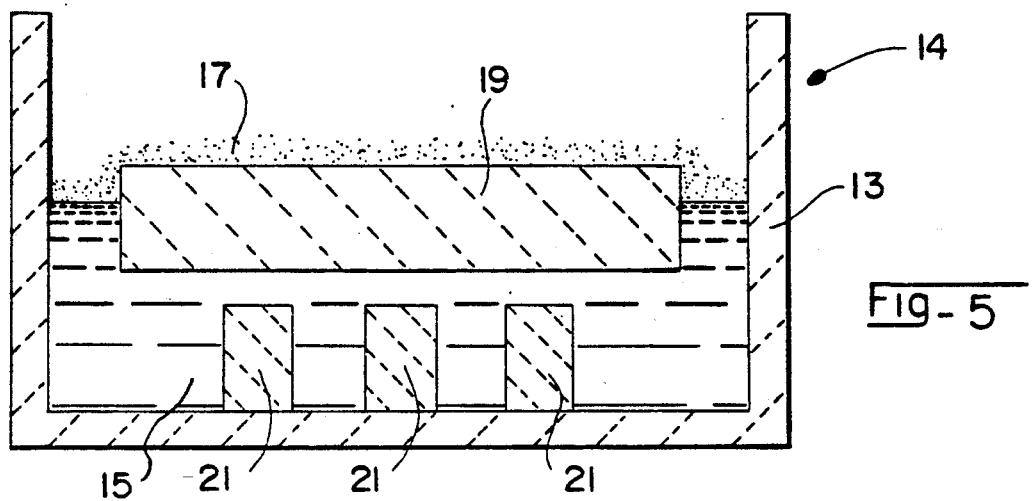
FIG. 5 is a cross-sectional view of a setup utilized in the flotation embodiment of the instant invention wherein support pegs are employed.

FIG. 5 displays a cross-section of a setup (14) for the batch process technique of the flotation embodiment which can be used to prevent the preform (19) from sinking below the surface of the molten pool of parent metal (15) as the preform (19) is infiltrated by oxidation reaction product. As shown in FIG. 5, a preform (19) floats upon the surface of the molten pool of parent metal (15) above a set of pegs (21) which are attached to or rest upon the bottom of a container (13). The container (13) holds the molten pool of parent metal (15). The surfaces of the molten pool of parent metal (15) and the preform (19) which are exposed to the surrounding atmosphere are covered with a thin layer (17) of a material which prevents or inhibits reaction between the surrounding atmosphere and the molten parent metal. However, the layer (17) does not prevent the atmosphere from contacting the preform (19) and allowing oxidation reaction product to grow into and at least partially infiltrate the preform (19). As described above, the set of pegs (21) are made of a material which does not substantially degrade or react with the molten parent metal at the temperatures utilized in the instant process. Further, the set of pegs (21) should be of a size and shape which is sufficient to prevent at least a portion of the preform (19) from sinking below the surface of the molten pool of parent metal (15) after the preform (19) has been at least partially infiltrated by oxidation reaction product.

Another means for preventing the preforms from sinking below the surface of the molten pool of parent metal is to attach a flotation collar to the preform. This flotation collar could comprise a material which can support the weight of the preform, i.e., maintain at least a portion of the preform above the surface of the molten pool of parent metal. Further, in a preferred embodiment, the flotation collar could be at least somewhat impervious to the growth of the oxidation reaction product of the molten parent metal and the oxidant. Specifically, if the flotation collar is not impervious, then the collar may become integral with the embedded preform, which in most cases, would not be desirable. Another consideration regarding the flotation collar is that if the flotation collar is partially infiltrated by the oxidation reaction product, it should still maintain enough buoyancy in this partially infiltrated condition to support the weight of the embedded preform.

Figure 6:
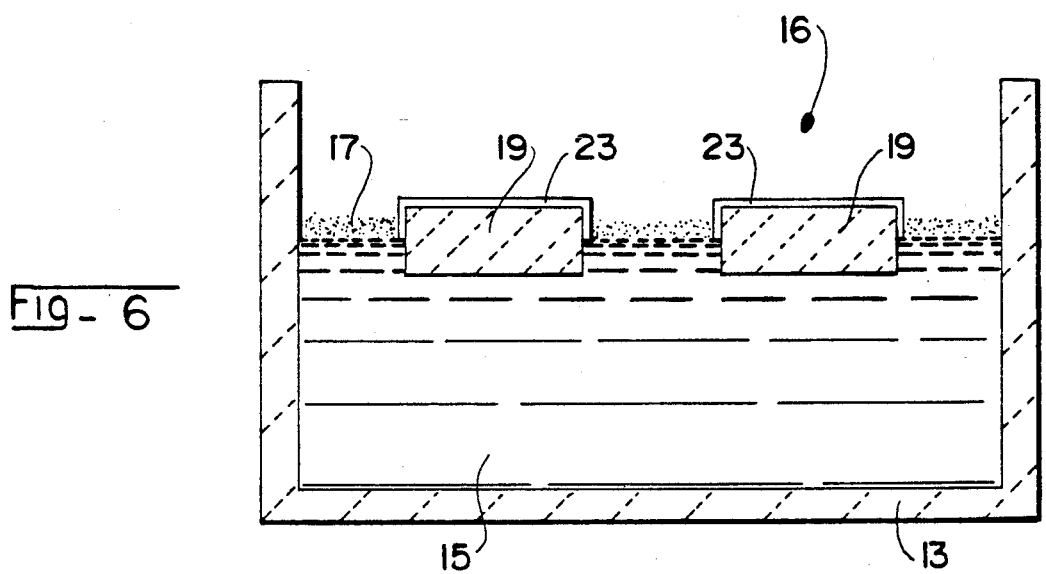
FIG. 6 is a cross-sectional view of a setup utilized in the flotation embodiment of the instant invention wherein flotation collars are employed.

FIG. 6 displays a cross-section of a setup (16) for the batch process technique of the flotation embodiment which can be used to prevent the preforms (19) from sinking below the surface of the molten pool of parent metal (15) as the preforms (19) are embedded by the growth of oxidation reaction product. As shown in FIG. 6, multiple preforms (19) float upon the surface of the molten pool of parent metal (15) which is held within a container (13). Attached to each preform is a flotation collar (23) comprising a material which has the characteristics described in the preceding paragraph. The flotation collars (23) maintain the preforms (19) above the surface of the molten pool of parent metal (15). The surfaces of the molten pool of parent metal (15) which are exposed to the surrounding atmosphere can be covered with a thin layer (17) of a material which prevents or inhibits reaction between the surrounding atmosphere and the molten parent metal. The exposed surfaces of the preforms (19) may also be covered with such material if they are not already covered by barrier material or the flotation collar (23).

In addition to the above-described techniques for preventing the preform from sinking below the surface of the molten pool of parent metal, a means whereby the preform is supported from above or from at least one side, way also be utilized. Specifically, the preform may be attached to a support means which extends to a point above, or to at least one side of, the molten pool of parent metal and which prevents at least a portion of the preform from sinking below the surface of the molten pool of parent metal. For example, a stationary support means could be attached to the preform and to a point above, or to at least one side of, the surface of the molten pool of parent metal. This stationary support means would be useful in the batch and semi-continuous methods of the instant embodiment. In the continuous embodiment, the support means could be attached to a track or wire located above, or to at least one side of, the surface of the molten pool of parent metal. In this embodiment, the support means could also function as part of the means for moving the preform across the surface of the molten pool of parent metal.

Figure 7:
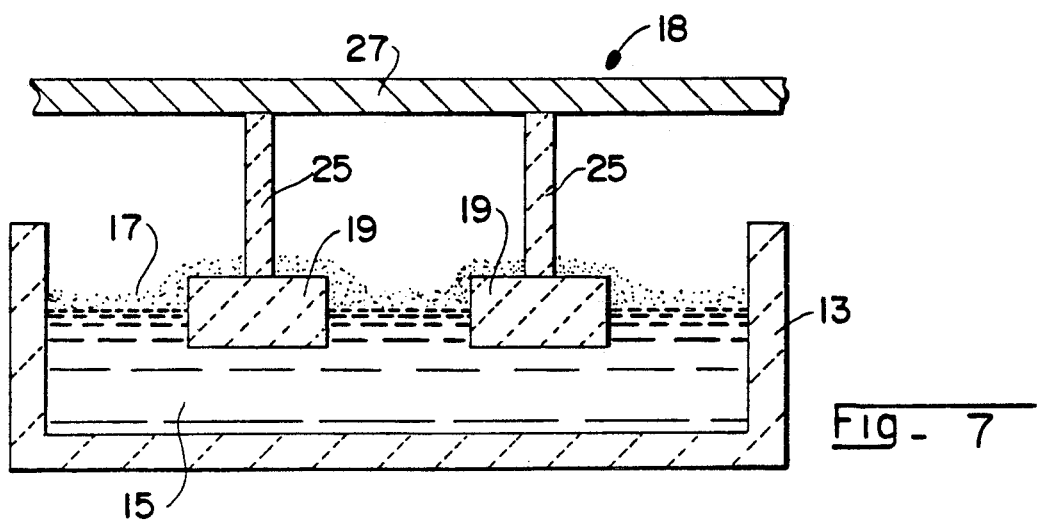
FIG. 7 is a cross-sectional view of a setup utilized in the flotation embodiment of the instant invention wherein overhead support means are utilized.

FIG. 7 displays a cross-section of a setup (18) for the batch process technique of the flotation embodiment which can be used to prevent the preforms (19) from sinking below the surface of the molten pool of parent metal (15) as the preforms (19) are infiltrated by oxidation reaction product. As shown in FIG. 7, multiple preforms (19) float upon the surface of the molten pool of parent metal (15) which is held within a container (13). The preforms (19) are attached to support members (25) which are attached to an overhead support (27). The combination of the support members (25) and the overhead support (27) form an overhead support means which prevents the preforms (19) from sinking below the surface of the molten pool of parent metal (15). The support members (25) may be constructed so that they only provide support after the preforms (19) have partially sunk into the molten pool of parent metal (15). The surfaces of the molten pool of parent metal (15) and the preforms (19) which are exposed to the surrounding atmosphere are covered with a thin layer (17) of a material which prevents or inhibits reaction between the surrounding atmosphere and the molten parent metal. However, the layer (17) does not prevent the atmosphere from contacting the performs (19), thus allowing oxidation reaction product to grow into and at least partially embed the preforms (19).

An external means for preventing the preform from sinking below the surface of the parent metal may be required only in those situations where a vapor-phase oxidant is required and there is no suitable means for providing the vapor-phase oxidant to the preform when the preform is totally immersed within the molten pool of parent metal.

The molten pool of parent metal, described above, is not limited by size or shape. For example, the molten pool of parent metal may have a surface which is square, rectangular, circular, triangular, etc. Further, the molten pool of parent metal may have a surface area which ranges from less than several square millimeters to greater than several thousand square meters.

In another embodiment of the instant invention a loose mass of filler material, or a preform, is at least partially confined within a support means and subsequently lowered into a molten pool of parent metal (this embodiment is sometimes hereinafter referred to as the "immersion" embodiment). As in the previous embodiments of the present invention, this technique may be utilized as a batch process, a semi-continuous process, or a continuous process.

When the immersion embodiment is utilized as a batch process, a mass of filler material or a preform may be either confined within or attached to a support means which is subsequently lowered into contact with a molten pool of parent metal.

After the oxidation reaction product of the molten parent metal and an oxidant has substantially completely grown into and embedded the loose mass of filler material or preform, the embedded mass of filler material or preform is raised from the molten pool of parent metal and allowed to cool. The molten pool of parent metal would then be drained and replaced by a fresh pool of molten parent metal which would be utilized for the growth of the next ceramic matrix composite body.

If a vapor-phase oxidant is employed in the immersion embodiment, at least a portion of the preform or loose mass of filler material should be maintained above the surface of the molten pool of parent metal, unless a means is utilized to supply the loose mass of filler material or preform with vapor-phase oxidant. An example of such a means is displayed in cross-section in FIG. 1 where a stainless steel tube (1) is utilized to provide the preform (2) with vapor-phase oxidant. As shown in FIG. 1, a preform (2) having the shape of a truncated cone is held within a support means (3) which comprises a threaded rod (4) which has a nut (5) attached to its lower end. The nut (5) is held within a refractory plug (6). At the upper end of the preform, the threaded rod (4) passes through a stainless steel plate (9) and into a stainless steel tube (37). The lower end of the stainless steel tube (37) is in contact with the stainless steel plate (9) and the upper end of the stainless steel tube.(37) is in contact with a washer (35). Above this washer, the threaded rod (4) is surrounded by two springs (39) contained within three washers (35). At the top of the stainless steel rod (4) is a second nut (33). When the upper nut (33) is tightened, the stainless steel tube (37) exerts pressure on the stainless steel plate (9). In addition, the refractory plug (6) is pulled towards the preform (2). By using gaskets (8) comprising a refractory paper known as "Fiberfrax ® paper" (produced by Sohio/Carborundum) between the upper end of the preform (2) and the bottom of the stainless steel plate (9), and between the lower end of the preform (2) and the top of the refractory plug (6), and tightening the upper nut (33), the inner surfaces (41) of the preform can be sealed from the surrounding environment. By passing a vapor-phase oxidant through the stainless steel tube (1) and into the interior of the preform (2), an oxidation reaction product can be grown from the molten parent metal (43) towards the inner surfaces (41) of the preform (2). A means for directing the flow of the vapor-phase oxidant towards the inner surfaces (41) of the preform (2) may be utilized in combination with the stainless steel tube (1). In a preferred embodiment of the instant invention, the above-described means comprises a reticulated ceramic piece which extends in several directions, and preferably in all directions, from the stainless steel tube and towards the inner surfaces (41) of the preform (2). The reticulated ceramic piece may have an interconnected porosity by volume of greater than about 20% and less than about 95%, e.g., suitable materials include Amporox molten metal filters (grades T-10 coarse and T-2 coarse, Astro Met, Inc., Cincinnati, Ohio 45215). The vapor-phase oxidant is forced into the reticulated ceramic piece at one or more locations and exits from the piece at several locations, some of which are preferably located proximately to the lower sections of the inner surfaces (41) of the preform, thereby causing the flow of said vapor-phase oxidant to be directed towards the lower sections of the inner surfaces (41) of the preform before the vapor-phase oxidant rises and contacts the middle and upper sections of the inner surfaces (41) of the preform (2). This technique provides the lower sections of the inner surfaces (41) of the preform (2) with greater access to vapor-phase oxidant, thus resulting in a more uniform oxidation reaction product growth pattern within the preform (2). The inner surfaces (41) of the preform (2) may be coated with a barrier material to prevent overgrowth of oxidation reaction product. An external means for supplying vapor-phase oxidant, such as the means illustrated in FIG. 1, may not be necessary in systems utilizing at least one oxidant selected from the group consisting of a solid oxidant, a liquid oxidant, and an internal source of vapor-phase oxidant. For example, to produce at least one vapor-phase oxidant at a temperature which is greater than room temperature and preferably is at or near the melting temperature of the parent metal, a substance or mixture of substances which decompose or react with one another can be disposed within the interior of the preform to supply at least one vapor-phase oxidant to the interior of the preform at the oxidation reaction temperature. Alternatively, the preform itself may comprise a solid oxidant, a liquid oxidant, or a combination of the two. is In the semi-continuous version of the immersion embodiment, the molten pool of parent metal could be re-used for many successive growths of oxidation reaction product until either (1) the pool of molten parent metal was exhausted, or (2) the concentration of certain constituents of the parent metal were either increased or decreased to such an extent as to affect adversely the desired growth of oxidation reaction product.

In the continuous version of the immersion embodiment, a series of setups, each setup comprising a loose mass of filler material or a preform either confined within or attached to a support means, could be lowered into, pulled through, and raised from a molten pool of parent metal. This continuous process could be accomplished by attaching the support means of each setup to a track or wire and calibrating the motion of the track or wire so that the setup is in contact with the molten pool of parent metal for a sufficient time to allow the desired extent of oxidation reaction product growth into the loose mass of filler material or preform. A continuous process using the immersion embodiment and a vapor-phase oxidant is illustrated in FIG. 2.

Figure 2:
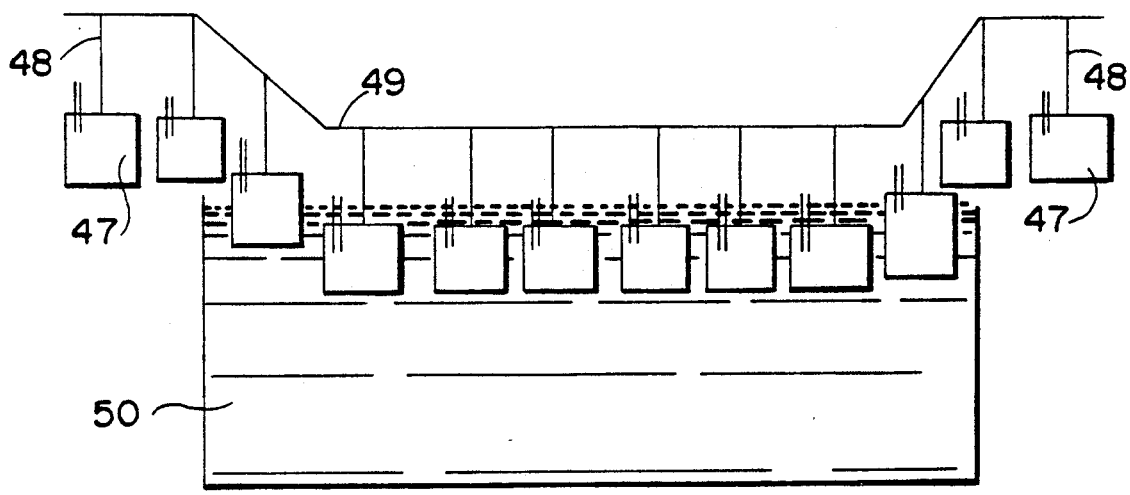
FIG. 2 is a cross-sectional view of a continuous process utilizing the immersion embodiment of the instant invention.

As shown in FIG. 2, a series of setups (47) are continuously lowered into, pulled through, and raised from a molten pool of parent metal (50). The setups (47) are attached to support members (48) which are attached to, and move along. a track (49).

As in the batch process method of the immersion embodiment, the semi-continuous and continuous methods may utilize an external means for providing vapor-phase oxidant to the preform or loose mass of filler material when that preform or loose mass of filter material is completely immersed within the molten pool of parent metal. Thus, as shown in FIG. 2, the setup shown in FIG. 1 can also be utilized in the semi-continuous and continuous versions of the immersion embodiment.

As discussed above, it may be necessary or desirable in the continuous process method to increase or decrease the concentration of certain constituents of the molten pool of parent metal during the continuous process. This increase or decrease may be desirable because certain constituents. The concentrations of the various constituents can be monitored by, for example, using sensors or continuous sampling techniques. When it becomes necessary to increase or decrease the concentration of certain constituents of the parent metal, any convenient means may be utilized, such as the direct addition f one or more constituents or the addition of elements or compounds which react with certain constituents to increase or decrease the concentration of those constituents.

In both the flotation and the immersion embodiments of the instant invention, barrier means may be utilized to control the growth of the oxidation reaction product and permit the formation of shaped ceramic matrix composite bodies. These barrier means and the materials of which they are constructed are discussed in other sections herein.

Another embodiment of the present invention relates to continuous methods of forming ceramic matrix bodies comprising the oxidation reaction product of a molten parent metal and an oxidant. In this embodiment, a molten parent metal would be brought into contact with an oxidant to form the oxidation reaction product of the parent metal with the oxidant. Preferably, at least one shaped barrier means would be utilized to provide a shaped cavity into which the oxidation reaction product would grow. Upon contacting the barrier means, the oxidation reaction product growth will terminate resulting in a shaped ceramic matrix body existing within the cavity defined by the barrier means. The final shaped ceramic matrix body would be produced by removing the barrier means and any residual parent metal carcass which may be attached to the surface of the ceramic matrix body which was in contact with the molten parent metal. In order to utilize this process in a continuous or semi-continuous fashion, a series of prefabricated structures comprising at least one barrier material would be contacted with molten parent metal for a time sufficient to allow growth of oxidation reaction product to occur to the boundaries defined by the internal walls of each shaped barrier material structure. When the growth of oxidation reaction product has substantially completely filled the internal cavity contained within the barrier material structure, the oxidation reaction would be terminated by either: (1) terminating the contact between the formed ceramic matrix body and the molten parent metal source; or (2) terminating the contact between the oxidant and the molten parent metal source. With respect to technique (1), described immediately above, the contact between the molten parent metal and the ceramic matrix body could be terminated by physically removing the ceramic matrix body, contained within the barrier material structure, from contact with the molten source of parent metal. Alternatively, the internal cavity within the barrier material structure could be supplied with a precalculated amount of parent metal which is sufficient to grow a desired amount of oxidation reaction product.

With respect to technique (2), described in the preceding paragraph, the contact between the oxidant and the molten metal source could be terminated by supplying the shaped barrier material structure with an oxidant through an external means, such as a hollow tube of refractory material or stainless steel, and terminating the feed of oxidant when the growth of oxidation reaction product has filled, to a desired extent, the internal cavity contained within the barrier material structure. Alternatively, the internal cavity contained within the barrier material structure could be initially supplied with a precalculated amount of oxidant so that the oxidant will be depleted when the growth of oxidation reaction product has filled the internal cavity to a desired extent.

One method of achieving continuous production of ceramic matrix bodies is to create self-enclosed structures of barrier material having at least one internal cavity. At least part of one of the internal cavities could have a configuration which would allow the production of ceramic matrix bodies having a shape which corresponds to the shape of the internal cavity. Further, at least part of one of the internal cavities could contain parent metal. This parent metal could be introduced initially during the formation of the self-enclosed barrier material structure as a solid ingot of parent metal or the parent metal could be introduced at any time in a powdered or liquid state through a small hole or opening in the barrier material structure. The quantity of parent metal introduced to the self-enclosed barrier material structure could be either: (1) a precalculated amount sufficient to produce a growth of oxidation reaction product which would fill the shaped sections of the internal cavity to a desired extent; or (2) an amount which would be more than enough to create a growth of oxidation reaction product which would completely fill all of the shaped sections of the internal cavity. The latter technique, technique (2), could produce a ceramic matrix body having attached thereto some residual unreacted parent metal, i.e., a parent metal carcass.

The self-enclosed barrier material structure, described in the preceding paragraph, may be supplied with oxidant through a number of means. First, the barrier material structure may be permeable to a mounding oxidant. Second, an external means may be utilized to supply the internal cavity with oxidant. For example, a hollow tube of refractory material or stainless steel, through which at least one oxidant is allowed to pass, could be utilized. Finally, the shaped section of the internal cavity may be initially supplied with a precalculated amount of at least one oxidant which would be sufficient to allow the formation of a growth of oxidation reaction product which would fill the shaped sections of the internal cavity to a desired extent.

The above described self-enclosed barrier material structures could be continuously supplied to a means which moves the structures through a heating means (for example, a furnace) which allows the self-enclosed barrier material structures and their contents to attain the temperature necessary for the oxidation reaction to occur. The means for moving the self-enclosed barrier material structures could be calibrated so that the self-enclosed barrier material structures and their contents would remain at the oxidation reaction temperature for a time sufficient to permit a growth of oxidation reaction product to fill, to a desired extent, the shaped sections of the internal cavities of the barrier material structures. After the desired amount of oxidation reaction product growth has occurred, the self-enclosed barrier material structures and their contents are cooled and the barrier materials and parent metal carcasses, if any, are removed from the resulting shaped ceramic matrix bodies.

Another method of continuously producing ceramic matrix bodies is to contact the open section of a series of barrier material structures containing: (1) a shaped cavity; and (2) an open section, with a molten pool of parent metal. The molten parent metal could react with an oxidant to form an oxidation reaction product which could grow into the shaped cavity contained within each barrier material structure. When the growth of oxidation reaction product has filled, to a desired extent, the shaped cavity contained within each barrier material structure, the supply of oxidant, or contact between the ceramic matrix body, contained within the barrier material structure, and the molten source of parent metal, is terminated, thus preventing further growth of oxidation reaction product.

There are many techniques whereby the barrier material structures could be continuously contacted with the molten pool of parent metal. One method comprises covering the molten pool of parent metal with a barrier material containing holes or slots through which the oxidant may contact the molten parent metal. A barrier material structure containing a shaped cavity is placed on top of each hole or slot so that oxidation reaction product may grow from the hole or slot into the shaped cavity contained within each barrier material structure. This method may require that substantially all of the surface of the molten pool of parent metal be covered with the barrier material to prevent unwanted growth of oxidation reaction product at sites other than the holes or slots. A system could be developed whereby the surface of the molten pool of parent metal is continuously covered with at least one barrier material when the temperature and oxidant conditions are such that oxidation reaction product would develop at any parent metal sites which are not covered by the barrier material. Therefore, by controlling the temperature of the parent metal and/or the atmosphere or environment which is in contact with the parent metal, growth of oxidation reaction product can be controlled during those periods when the surface of the parent metal is not covered by a barrier material. By continuously removing the barrier material structures which have been filled, to a desired extent, with the growth of oxidation reaction product, and placing fresh barrier material structures over the exposed holes or slots, a continuous process can be achieved.

Another method of continuously forming ceramic matrix bodies by utilizing a molten pool of parent metal is to contact continuously the open section of a barrier material structure comprising: (1) an open section; and (2) a shaped cavity connected with the open section, with a molten pool of parent metal. The barrier material structure could be connected to a means which moves the barrier material structure across the surface of or through the molten pool of parent metal. A cavity contained within the barrier material structure could be initially supplied with a solid or liquid oxidant or could be supplied with an oxidant through an external means, for example by utilizing a hollow tube of refractory material or stainless steel which is connected to an oxidant source. The exposed surfaces of the molten pool of parent metal which are not in contact with the open section of the barrier material structure could be covered with a barrier material (such as wollastonite particulate) in those situations where the atmosphere or environment may be reactive with the molten parent metal. The means for moving the barrier material structures across the surface of or through the molten pool of parent metal could be calibrated to permit the open section of the barrier material structures to be in contact with the molten pool of parent metal for a time sufficient to allow growth of oxidation reaction product which would fill, to a desired extent, the internal cavity contained within the barrier material structure. By continuously supplying fresh barrier material structures to one section of the molten pool of parent metal and removing barrier material structures which are filled, to a desired extent, with the growth of oxidation reaction product from another section of the molten pool of parent metal, a continuous process can be achieved.

Many of the methods for continuously forming ceramic matrix bodies, discussed above, can be adapted to produce ceramic matrix composite bodies. For instance, the shaped cavity contained within the barrier material structure may initially contain a filler material which may be subsequently embedded by the growth of oxidation reaction product, thus forming a ceramic matrix composite body. Further, the cavity may contain at least one perform which may be embedded by the growth of oxidation reaction product. It may be necessary to provide a support means which prevents the filler material from escaping through the open section of the barrier material structure. This support means could have at least one opening which would allow molten parent metal to have access to the shaped cavity while preventing the filler material from escaping into the molten pool of parent metal.

A perform useful in the manufacture of the ceramic matrix composite body, when at least one oxidant is a vapor-phase oxidant, is one that is sufficiently porous or permeable to permit the vapor-phase oxidant to permeate into the preform so as to contact the parent metal. The preform also should be self-supporting and sufficiently permeable to accommodate the development or growth of the oxidation reaction product as a matrix within the preform without substantially disturbing, upsetting, or otherwise altering the configuration or geometry of the preform.

A solid, liquid, or vapor-phase oxidant, or a combination of such oxidants, may be employed. For example, typical oxidants include, without limitation, oxygen, nitrogen, a halogen, sulphur, phosphorus, arsenic, carbon, boron, selenium, tellurium, and/or compounds and combinations thereof, for example, silica (as a source of oxygen), methane, ethane, propane, acetylene, ethylene, and propylene (as sources of carbon), and mixtures such as air, $H_2/H_2O$ and $CO/CO_2$, the latter two (i.e., $H_2/H_2O$ and $CO/CO_2$) being useful in reducing the oxygen activity of the environment. Accordingly, the ceramic matrix structure of the invention may comprise an oxidation reaction product comprising one or more of oxides, nitrides, carbides, borides and oxynitrides. More specifically, the oxidation reaction product may, for example, be one or more of aluminum oxide, aluminum nitride, silicon carbide, silicon boride, aluminum boride, titanium nitride, zirconium nitride, titanium boride, zirconium boride, titanium carbide, zirconium carbide, silicon nitride, hafnium boride and tin oxide. Although the oxidation reaction is usually described as employing a vapor-phase oxidant, either alone or in conjunction with an oxidant which is a solid or liquid under the process conditions, it should be understood that the utilization of a vapor-phase oxidant is not necessary to produce the ceramic matrix composite body. When a vapor-phase oxidant is not employed and an oxidant which is a solid or liquid under the process conditions is used, the preform need not be permeable to the surrounding atmosphere. However, the preform should still be sufficiently permeable to accommodate the development or growth of the oxidation reaction product as a matrix within the preform without substantially disturbing, upsetting, or otherwise altering the configuration or geometry of the preform.

The use of solid or liquid oxidants may create an environment within the preform more favorable to the oxidation kinetics of the parent metal than the environment outside the preform. This enhanced environment is beneficial in promoting matrix development within the preform to the boundary and minimizing overgrowth. When a solid oxidant is employed, it may be dispersed through the entire perform or through a portion of the preform adjacent to the parent metal, such as in particulate form and admixed with the preform, or it may be utilized as coatings on the particles comprising the preform. Suitable solid oxidants may include suitable elements, such as boron or carbon, or suitable reducible compounds, such as silicon dioxide (as a source of oxygen) or certain borides of lower thermodynamic stability than the boride reaction product of the parent metal.

If a liquid oxidant is employed, the liquid oxidant may be dispersed throughout the entire perform or a portion thereof adjacent to the molten parent metal. Reference to a liquid oxidant means one which is a liquid under the oxidation reaction conditions, and so a liquid oxidant may have a solid precursor, such as a salt, which is molten or liquid at the oxidation reaction conditions. Alternatively, the liquid oxidant may be a liquid precursor, e.g. a solution of a material, which is used to coat part or all of the porous surfaces of the preform and which is melted or decomposed at the process conditions to provide a suitable oxidant moiety. Examples of liquid oxidants as herein defined include low melting glasses.

As explained in the Commonly Owned Patent Applications and Patents, the addition of dopant materials, in conjunction with, for example, aluminum parent metal, can favorably influence the oxidation reaction process. The function or functions of the dopant material can depend upon a number of factors other than the dopant material itself. These factors include, for example, the end product desired, the particular combination of dopants when two or more dopants are used, the use of externally applied dopants in combination with an alloyed dopant, the concentration of the dopant(s), the oxidizing environment, and the process conditions.

The dopant or dopants used in conjunction with the parent metal: (1) may be provided as alloying constituents of the parent metal; (2) may be applied to at least a portion of the surface of the parent metal; (3) may be added to the filler material; or (4) any combination of techniques (1), (2) and (3) may be employed. For example, an alloyed dopant may be used in combination with an externally applied dopant. A source of the dopant may be provided by placing either a dopant powder or a rigid body of dopant in contact with at least a portion of the parent metal surface. For example, a thin sheet of silicon-containing glass can be placed upon a surface of an aluminum parent metal. When the aluminum parent metal (which may be internally doped with Mg) overlaid with the silicon-containing material is heated in an oxidizing environment (e.g., in the case of aluminum in air, between about 850° C. to about 1450° C., preferably about 900° C. to about 1350° C.), growth of the polycrystalline ceramic material occurs. In the case where the dopant is externally applied to at least a portion of the surface of the aluminum parent metal, the polycrystalline aluminum oxide structure generally grows substantially beyond the dopant layer (i.e., to beyond the depth of the applied dopant layer). In any case, one or more of the dopants may be externally applied to the parent metal surface. Additionally, any concentration deficiencies of the dopants alloyed within the parent metal may be augmented by additional concentration of the respective dopant(s) applied external to the parent metal.

Useful dopants for an aluminum parent metal, particularly with air as the oxidant, include, for example, magnesium, zinc and silicon, in combination with each other or in combination with other dopants described below. These metals, or a suitable source of the metals, may be alloyed into the aluminum-based parent metal at concentrations for each of between about 0.1–10% by weight based on the total weight of the resulting doped metal. Concentrations within this range appear to initiate the ceramic growth, enhance metal transport and favorably influence the growth morphology of the resulting oxidation reaction product. The concentration range for any one dopant will depend on such factors as the combination of dopants and the process temperature.

Other dopants which are effective in promoting alumina polycrystalline oxidation reaction product growth, from aluminum parent metal systems are, for example, germanium, tin and lead, especially when used in combination with magnesium. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1–10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying materials to be added at a lower temperature.

In the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with an aluminum parent metal, include sodium and lithium, which may be used individually or in combination with one or more other dopants depending on the process conditions. Sodium and lithium may be used in very small amounts (in the parts per million range, typically about 100–200 parts per million) and each may be used alone or together, or in combination with other dopant(s). Calcium, boron, phosphorus, yttrium, and rare earth elements such as cerium, lanthanum, praseodymium, neodymium and samarium are also useful dopants, and herein again especially when used in combination with other dopants.

The dopant materials, when used externally, are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum based parent metal using air or oxygen as the oxidant, quantities as low as 0.00003 gram of silicon per gram of parent metal, or about 0.0001 gram of silicon per square centimeter of exposed parent metal surface, together with a second dopant source of magnesium, have been used to produce the polycrystalline ceramic growth phenomenon. It also has been found that a ceramic structure is achievable from an aluminum-silicon alloy parent metal using air or oxygen as the oxidant by using MgO as the dopant in an amount greater than about 0.0008 gram of Mg per gram of parent metal to be oxidized and greater than 0.003 gram of Mg per square centimeter of parent metal surface upon which the MgO is applied.

Where the parent metal is aluminum internally doped with magnesium and the oxidizing medium is air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy and during the growth process such magnesium compounds remain primarily at the initial oxide surface of the parent metal alloy (e.g., the "initiation surface") in the grown ceramic matrix structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting prior to using the polycrystalline ceramic matrix product.

In an alternative embodiment of the invention,,during growth of the polycrystalline oxidation reaction product, a different vapor-phase oxidant can be introduced. In this context, "different" should be understood as meaning having a composition which is chemically different from the composition of an initial vapor (or solid) phase oxidant. Thus, the second oxidation reaction product formed with the "different" vapor-phase oxidant will result in the formation of two ceramic matrix bodies or phases integrally attached to each other having graded properties (e.g., a layer can be formed on a first formed ceramic matrix composite body).

In another embodiment, a ceramic matrix composite body is first completely formed, and thereafter the completely formed ceramic matrix composite body is exposed to an oxidant, preferably a "different" oxidant than that which was used to form the oxidation reaction product which serves as a matrix for the embedded filler material in the ceramic matrix composite body. In this alternative embodiment, residual interconnected parent metal in the ceramic matrix composite body is drawn towards at least one surface of the ceramic matrix composite body and is caused to react with the "different" oxidant, thus forming a different oxidation reaction product on a substrate of a first formed oxidation reaction product.

In yet another embodiment of the invention, the metallic constituent in the ceramic matrix composite body can be tailored by changing the composition thereof. Specifically, for example, a second metal can be alloyed with or diffused into the parent metal during, for example, growth of oxidation reaction product to change favorably the composition, and thus, mechanical, electrical and/or chemical properties of the parent metal.

To assist in forming a shaped ceramic matrix composite body, a barrier means can be used in conjunction with a filler material or a preform. Specifically, a barrier means which is suitable for use with this invention may be any suitable means which interferes, inhibits, or terminates growth or development of the oxidation reaction product. Suitable barrier means may be any material, compound, element, composition, or the like, which, under the process conditions of this invention, maintains some integrity, is not volatile and preferably is permeable to a vapor-phase oxidant, if a vapor-phase oxidant is used, while being capable of locally inhibiting, poisoning, stopping, interfering with, preventing, or the like, continued growth of the oxidation reaction product.

It appears that one category of barrier means is that class of materials which may be substantially non-wettable by the transported molten parent metal. A barrier of this type appears to exhibit substantially little or no affinity for the molten metal, and growth is terminated or inhibited by the barrier means. Other barriers tend to react with the transported molten parent metal to inhibit further growth either by dissolving into and diluting the transported metal excessively or by forming solid reaction products (e.g., intermetallics, which obstruct the molten metal transport process). A barrier of this type may be a metal or metal alloy, including any suitable precursor thereto such as an oxide or a reducible metal compound, or a dense ceramic material. Because of the nature of the growth inhibition or obstruction process with this type of barrier, growth may extend into or somewhat beyond the barrier before growth is terminated. Nevertheless, the barrier reduces any final machining or grinding that may be required of the formed oxidation reaction product. As stated above, the barrier should preferably be permeable or porous, and therefore, when a solid, impermeable wall is used, the barrier should be opened in at least one zone or at one or both ends to permit the vapor-phase oxidant to contact the molten parent metal.

Suitable barriers particularly useful in this invention in the case of using aluminum parent metals and employing air as an oxidant are calcium sulfate, calcium silicate, and tricalcium phosphate. These barriers appear to react locally with developing oxidation reaction product to form an impermeable calcium aluminate layer which locally terminates further growth of oxidation reaction product. Such barriers typically may be applied as a slurry or paste to the surfaces of a filler bed which preferably is preshaped as a preform. The barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed is especially desirable. For example, if the preform comprises alumina and the resulting ceramic comprises alumina, the barrier may be admixed with alumina particulate, desirably having a mesh size of about 20-1000. The alumina particulate may be mixed with the calcium sulfate, for example, in a ratio ranging from about 10:1 to 1:10, with the preferred ratio being about 1:1. In one embodiment of the invention, the barrier means includes an admixture of calcium sulfate (i.e. Plaster of Paris and portland cement). The portland cement may be mixed with the Plaster of Paris in a ratio of 10:1 to 1:10, with the preferred ratio of portland cement to Plaster of Paris being about 1:3. Where desired, portland cement may also be used alone as the barrier material.

Another embodiment, when using an aluminum parent metal and air as the oxidant, comprises using as a barrier Plaster of Paris admixed with silica in a stoichiometric amount, but there can be an excess of Plaster of Paris. During processing, the Plaster of Paris and silica react to form calcium silicate, which results in a particularly beneficial barrier in that it is substantially free of fissures. In still another embodiment, the Plaster of Paris is admixed with about 25–40 weight percent calcium carbonate. On heating, the calcium carbonate decomposes emitting carbon dioxide, thereby enhancing the porosity of the barrier means.

Other particularly useful barriers for aluminum-based parent metal systems include ferrous materials (e.g., a stainless steel container), chromia and other refractory oxides, which may be employed as a superimposed wall or container to the filler bed, or as a layer to the surface of a filler bed. Additional barriers include dense, sintered or fused ceramics such as alumina. These barriers are usually impermeable, and therefore are either specially fabricated to allow for porosity or require an open section such as an open end. The barrier means may form a friable product under the reaction conditions and can be removed as by abrading to recover the ceramic matrix body.

The barrier means may be manufactured or produced in any suitable form, size, and shape, and preferably is permeable to the vapor-phase oxidant, when such an oxidant is utilized. The barrier means may be applied or utilized as a film, paste, slurry, pervious or impervious sheet or plate, or a reticulated or foraminous web such as a metal or ceramic screen or cloth, or a combination thereof. The barrier means also may comprise some filler and/or binder.

The size and shape of the barrier means depends on the desired shape for the ceramic matrix product. By way of example only, if the barrier means is placed or situated at a predetermined distance from the parent metal, growth of the ceramic matrix would be locally terminated or inhibited where it encounters the barrier means. Generally, the shape of the ceramic matrix product is the inverse of the shape of the barrier means. For example, if a concave barrier is at least partially spaced from a parent metal, the polycrystalline growth occurs within the volumetric space defined by the boundary of the concave barrier and the surface area of the parent metal. Growth terminates substantially at the concave barrier. After the barrier means is removed, a ceramic matrix body remains having at least a convex portion defined by the concavity of the barrier means. It should be noted that with respect to a barrier means having porosity, there may be some polycrystalline material overgrowth through the interstices, although such overgrowth is severely limited or eliminated by the more effective barrier materials. In such a case, after the barrier means is removed from the grown polycrystalline ceramic matrix body, any polycrystalline overgrowth may be removed from the ceramic matrix body by grinding, grit blasting or the like, to produce the desired ceramic matrix part with no remaining overgrowth of polycrystalline material. By way of a further illustration, a barrier means spaced from a parent metal, and having a cylindrical protuberance in the direction of the metal, will produce a ceramic matrix body with a cylindrical recess inversely replicating the same diameter and depth of the cylindrical protuberance.

In order to achieve minimal or no polycrystalline material overgrowth in the formation of ceramic matrix composite bodies, the barrier means may be placed on, or positioned in close proximity to, the defined surface boundary of any filler bed or preform. Disposal of the barrier means on the defined surface boundary of the bed or preform may be performed by any suitable means, such as by layering the defined surface boundary with the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, growth of the polycrystalline oxidation reaction product terminates upon reaching the defined surface boundary of the preform and contacting the barrier means.

In a preferred embodiment for manufacturing a ceramic matrix composite body, a permeable shaped preform (described below in greater detail) is formed having at least one defined surface boundary with at least a portion of the defined surface boundary in contact with or superimposed with the barrier means. It should be understood that the term "preform" may include an assembly of separate preforms ultimately bonded into an integral composite. The preform is placed adjacent to and in contact with one or more parent metal surfaces or a portion of a surface of the parent metal such that at least a portion of the defined surface boundary of the preform which is in contact with or superimposed with the barrier means is generally positioned distantly or outwardly from the metal surface, and formation of the oxidation reaction product will occur into the preform and in a direction towards the defined surface boundary with the barrier means. The barrier means, permeable preform and parent metal form a lay-up, and upon heating the lay-up in a furnace, the parent metal and the preform are exposed to or enveloped by, for example, a vapor-phase oxidant, which may be used in combination with a solid or liquid oxidant. The metal and oxidant react, and the reaction process is continued until the oxidation reaction product has grown into and embedded the preform and comes into contact with the defined surface boundary which is in contact with or superimposed with the barrier means. Most typically, the boundaries of the preform, and of the ceramic matrix, substantially coincide; but individual constituents at the surfaces of the preform may be exposed or may protrude from the matrix, and therefore infiltration and embedment of the preform by the ceramic matrix may not be complete in terms of completely embedding or encapsulating the preform by the matrix. The barrier means prevents, inhibits or terminates growth of the oxidation reaction product upon contact with the barrier means, and substantially no overgrowth of the oxidation reaction product occurs when a barrier material is utilized. The resulting ceramic matrix composite product includes a preform infiltrated or embedded to its boundaries by a ceramic matrix comprising a polycrystalline material consisting essentially of the oxidation reaction product of the parent metal with the oxidant and, optionally, one or more metallic constituents such as non-oxidized constituents of the parent metal or reduced constituents of an oxidant.

Although it may sometimes be necessary, when a vapor-phase oxidant is utilized, to cover any exposed surfaces of the molten pool of parent metal with a material which prevents or inhibits reaction between the atmosphere and the molten parent metal, there are certain conditions which will allow the flotation embodiment of the instant invention to be utilized without covering any exposed surfaces of the molten pool of parent metal. Specifically, the mass of filler material or preform may comprise at least one material which is necessary for growth of the oxidation reaction product of the vapor-phase oxidant and the molten parent metal. Thus, oxidation reaction product will not form on the surfaces of the molten pool of parent metal which are not in contact with the mass of filler material or preform and accordingly, no covering material is necessary on the exposed surfaces of the molten pool of parent metal.

Alternatively, the mass of filler material or preform may physically, as opposed to chemically, interact with the molten pool of parent metal to permit the formation of an oxidation reaction product of the molten parent metal and the vapor-phase oxidant which grows into and embeds the mass of filler material or preform. Specifically, the particles contained within the mass of filler material or preform may provide the molten parent metal with a wettable surface which permits the molten parent metal to escape any natural protective layer which may exist on the surface of the molten pool of parent metal. Once the molten parent metal has escaped the natural protective layer, it may react with the vapor-phase oxidant to form a body of oxidation reaction product within the mass of filler material or preform. Moreover, this body of oxidation reaction product does not form on the surfaces of the molten pool of parent metal which are exposed to the vapor-phase oxidant because the natural protective layer prevents any further interaction between the molten parent metal and the vapor-phase oxidant. Thus, it is not necessary to cover the exposed surfaces of the molten pool of parent metal with a material which prevents or inhibits reaction between the atmosphere and the molten parent metal. Therefore, in certain situations, it is possible to select a combination of filler material, parent metal, dopants, oxidant, and reaction temperature which will allow an oxidation reaction product of a molten parent metal and a vapor-phase oxidant to grow into and embed a mass of filler material or a preform which is moating on the surface of a molten pool of parent metal, without any requirement for covering any exposed surfaces of the molten pool of parent metal with a material which prevents or inhibits reaction between the vapor-phase oxidant and the molten parent metal.

The flotation embodiment of the instant invention can be used to produce ceramic matrix and ceramic matrix composite bodies that are quite large and thick. In addition, when the developing ceramic matrix and ceramic matrix composite bodies are permitted to sink to some extent below the surface of the molten pool of parent metal during the oxidation reaction of the molten parent metal and a vapor-phase oxidant, the portions of the bodies which sink below the surface of the molten pool of parent metal are prevented from having access to the vapor-phase oxidant and thus exhibit minimal overgrowth of the oxidation reaction product beyond the boundaries of the original mass of filler material or barrier, if a barrier is utilized. Finally, the flotation embodiment of the instant invention permits the furnace to be continuously operated in a relatively narrow temperature range because the furnace does not need to be cooled to ambient room temperature after the completion of each oxidation reaction product growth run. Accordingly, both the final cooling step and the initial heating step are avoided, which saves a significant amount of processing time.

The advantages of the flotation embodiment of the instant invention, some of which are set forth in the previous paragraph, allow this method to be utilized for the continuous production of ceramic matrix and ceramic matrix composite bodies having diverse sizes and geometries. Accordingly, the flotation embodiment of the instant invention will allow the mass production of a wide range of ceramic matrix and ceramic matrix composite products at a lower cost and with a more efficient use of raw materials and energy resources than the methods currently used in the art.

EXAMPLE 1

The following Example demonstrates the batch production method of utilizing the flotation embodiment of the instant invention.

Thirty preforms were prepared by the steps set forth below.

(1) A mixture of approximately 95 percent by weight Alcan C-73 unground 2.9 $\mu$m median particle diameter alumina (Alcan Chemicals, Division of Alcan Aluminum Co., Cleveland, Ohio) and about 5 percent by weight fine mesh MIN-U-SILI ® ground silica (U.S. Silica Company, Berkley Springs, W. Va.) was prepared.

(2) The solids mixture described in (1) was in turn mixed with an approximately 15 percent solution of ELVANOL ® 75-15 polyvinyl alcohol (E. I. du Pont de Nemours & Co., Wilmington, Del.) in water to form a new mixture wherein the percent solids of the polyvinyl alcohol solution amounted to about 2 percent by weight of the total solids.

(3) The mixture of (2) was then dryed to a moisture level of about 1-2 percent by weight.

(4) After drying, the mixture was sifted through a 20 mesh screen to produce a sifted mixture comprising particles having a diameter of about 840 $\mu$m and smaller.

(5) The sifted mixture was pressed, at pressures of approximately 10,000 pounds psi (703 Kg/cm$^2$), into rings approximately 0.4 inches (10 mm) high (measured from top to bottom) with an outer diameter of about 1.64 inches (42 m) and a thickness of about 0.23 inches (5.8 Pun) (measured from the inner diameter wall to the outer diameter wall).

(6) After pressing, the preforms were placed on a refractory plate, heated in air for about 24 hours at a temperature of about 1250° C., and then cooled to ambient room temperature.

(7) Upon reaching room temperature, the preforms were coated by hand with a barrier material mixture comprising about 50 percent by weight water and about 50 percent by weight of a mixture comprising about 30 percent by weight fine mesh MIN-U-SIL ® ground silica and about 70 percent by weight BONDEX ® plaster of paris (Bondex International, Inc., Brunswick, Ohio).

(8) The preforms were coated with the barrier material described in (7) on the outer diameter, the inner diameter, and one face, i.e., only one face was left uncoated.

(9) Approximately 10 grams of −325 mesh (45 μm and smaller in diameter) 99.99% pure silicon metal (obtained from Atlantic Equipment Engineers, Bergenfield, N.J.) was then mixed with about 25 grams of water to form a slurry which was painted onto the face of the preform which was not coated with barrier material.

(10) After the coatings had dried, the preforms were weighed and it was noted that the weight of barrier material was approximately 0.5 to 1.5 grams/preform and the weight of the silicon coating was approximately 0.03 to 0.07 grams/preform.

(11) The coated preforms were then heated to a temperature of approximately 900° C. and placed directly on the surface of a molten pool of an aluminum alloy at approximately 900° C.

(12) The aluminum alloy mentioned in (11) was commercially available aluminum alloy 380.1 having a nominally identified composition by weight of 8-8.5% Si, 2-3% Zn, and 0.1% Mg as active dopants, and 3.5% Cu as well as Fe, Mn, and Ni, but the Mg content was sometimes higher, e.g., in the range of about 0.17-0.18%.

(13) The surface of the preform which was in contact with the molten pool of aluminum alloy was the silicon coated surface.

(14) Just prior to placing the preforms on the surface of the molten pool of aluminum alloy, the surface of the pool was mechanically scraped to remove any protective layer of aluminum oxide skin which may have developed.

(15) After all thirty preforms were placed on the surface of the molten pool of aluminum alloy, an approximately ½ inch (13 mm) thick layer of NYAD® −325 mesh (45 μm and smaller in diameter) wollastonite powder (NYCO, Willisboro, N.Y.) was sifted onto all exposed surfaces of the molten pool of aluminum alloy to prevent any growth of oxidation reaction product from those exposed surfaces. The wollastonite powder also covered the exposed surfaces of the preforms.

(16) The surface area of the molten pool of aluminum alloy was approximately 90 square inches (58,064 mm$^2$).

(17) As each preform became completely embedded by the growth of oxidation reaction product of the molten aluminum alloy and air, it was removed from the surface of the molten pool of aluminum alloy with steel tongs and placed directly onto a sand bed in air at ambient room temperature. Before removing the embedded preforms from the furnace, excess molten parent metal was removed from each preform by shaking the preforms over the pool of molten parent metal. The first preform was removed after about 16 hours from when it was placed on the surface of the molten pool of aluminum alloy and the last preform was removed after about 24 hours from when it was placed on the surface of the molten pool of aluminum alloy.

After removing the barrier material and parent metal carcass, if any, the resulting ceramic matrix composite bodies were examined by visual inspection. It was noted that there was little or no overgrowth of the oxidation reaction product and that the dimensions of the resulting ceramic matrix composite bodies corresponded closely to the dimensions of the original preforms. Further, it was also noted that the oxidation reaction product of the aluminum parent metal and air had embedded the preforms quite rapidly.

EXAMPLE 2

The following Example demonstrates the semi-continuous method of utilizing the flotation embodiment of the instant invention.

Two approximately 10 inch (254 mm) by 12 inch (305 mm) by 6 inch (152 mm) deep containers were constructed. One of the containers was constructed of 90 RAM® PC plastic product refractory (C-E Refractories, Valley Forge, Pa.), and the other container was constructed of CASTOLAST® AL alumina castable refractory (Harbison-Walker Refractories, Pittsburg, Pa.). Both containers were fired before they were utilized for the instant experiment. After firing, the containers were loaded into a furnace and ingots of a commercially available 380.1 aluminum alloy having a nominally identified composition by weight of 8-8.5% Si, 2-3% Zn, and 0.1% Mg as active dopants, and 3.5% Cu as well as Fe, Mn, and Ni, were placed in each container and melted at approximately 700° C. to create a molten pool of aluminum alloy in each container. The magnesium content of the above-described 380.1 aluminum alloy was sometimes greater than that set forth in the nominally identified composition, e.g., the Mg content was sometimes in the range of about 0.17-0.18% by weight.

The first set of preforms to be floated on the surface of the molten pools of aluminum alloy were circular preforms comprised of 500 grit 39 CRYSTOLON® silicon carbide (sold by Norton Co., Worcester, Mass.) mixed with approximately 2-4% by weight ELMER'S® Professional Carpenter's Wood Glue (polyvinyl acetate, produced by Borden Chemical, Columbus, Ohio) and having approximate dimensions of 1 inch (25 mm) in height and 2 inches (51 mm) in diameter. Before the silicon carbide was mixed with the ELMER'S® Professional Carpenter's Wood Glue, a mass of the silicon carbide was prefired in air at about 1300° C. for about 24 hours to permit the formation of about 15-25% by weight of silica within the mass of silicon carbide particulate. The preforms were slightly bevelled so that the diameter at the bottom of the preform was approximately 2 inches (51 mm) and the diameter at the top of the preform was approximately 1¾ inches (45 mm). In addition, the preforms had an approximately ½ inch (13 m) deep by 1 inch (25 mm) in diameter cylindrical depression in their top surfaces. Three of these preforms (each originally at room temperature) were floated on the surface of the molten pool of aluminum alloy held within each container. The furnace temperature at the time of the initial floating of the preforms was approximately 700° C. At this temperature, the exposed surfaces of the molten pools of aluminum alloy were covered with an approximately 112 inch (13 mm) deep layer of fine wollastonite (described in Example 1). This wollastonite layer also covered the exposed surfaces of the preforms. The furnace temperature was then raised from about 700° C. to about 900° C. over about a two hour period. The temperature was maintained at about 900° C. for about 120 hours, and then ramped to about 700° C. over about a two hour period. The atmosphere in the furnace consisted of circulating air. The preforms were allowed to remain in contact with the molten aluminum alloy at about 700° C. for approximately 12 hours, at which time they were removed from the surfaces of the molten pools of aluminum alloy. All six preforms were fully embedded by the oxidation reaction product of the molten aluminum and the air.

The containers holding the molten aluminum alloy were maintained at about 700° C. while the wollastonite barrier material and any oxide layer which may have formed during the previous run were removed by mechanical scraping. Immediately after the scraping was complete, a preform (originally at room temperature) comprised of the same prefired silicon carbide particulate described in the previous paragraph but mixed with approximately 4 percent by weight ELMER'S ® Professional Carpenter's Wood Glue, and having approximate dimensions of about 6 inches (152 m) in outer diameter by about 4½ inches (114 mm) in inner diameter by about ½ inch (13 mm) in height, was placed on the surface of each molten pool of aluminum alloy. In addition, a preform (originally at room temperature) comprised of the above described prefired silicon carbide particulate mixed with approximately 2 percent by weight ELMER'S ® Professional Carpenter's Wood Glue, and having approximate dimensions of about 2 inches (51 mm) by about 2 inches (51 mm) by about 2 inches (51 mm), was placed on the surface of each molten pool of aluminum alloy. Prior to placing the preforms on the surfaces of the molten pools of aluminum alloy, the surface of each preform which was to be in contact with the molten aluminum alloy was coated with a silicon dopant slurry similar to that described in Example 1. The furnace temperature at the time of the initial floating of the preforms was approximately 700° C. At this temperature, the exposed regions of the surfaces of the molten pools of aluminum alloy were coated with an approximately ½ inch (13 mm) thick layer of fine wollastonite (described in Example 1). The wollastonite layer also covered the exposed surfaces of the preforms. The temperature was then raised from about 700° C. to about 980° C. over about a 2 hour period, and held at about 980° C. for approximately 200 hours before cooling to about 700° C. over about a two hour period. The preforms were removed from the surfaces of the molten pools of aluminum alloy at approximately 700° C. and examined by visual inspection. The above described 6 inch (152 mm) diameter rings were fully embedded by the oxidation reaction product of the molten aluminum and the air atmosphere. Moreover, the above described 2 inch (51 mm) by 2 inch (51 mm) by 2 inch (51 mm) silicon carbide preforms were also embedded by the oxidation reaction product of the molten aluminum alloy and the air atmosphere except for an approximately ⅛ inch (3.2 mm) thick layer at the top of each preform.

After the second run (described in the previous paragraph), the molten pools of aluminum alloy were partially replenished with fresh ingots of aluminum alloy having the same composition as the aluminum alloy described above. The additional ingots of aluminum alloy were added to the furnace while the furnace temperature was approximately 700° C. Approximately 30 minutes were allowed for the aluminum to melt before the residual wollastonite, and any oxide skin remaining on the surface of the molten pools of aluminum alloy from the second run, were removed by mechanical scraping. Immediately after the mechanical scraping step was completed, an about 4½ inch (114 mm) by about 6½ inch (165 mm) by about 1 inch (25 mm) thick silicon carbide preform (having the same composition as the approximately 2 inch (51 mm) by 2 inch (51 mm) by 2 inch (51 mm) cube preform in the second run) was floated on the surface of each molten pool of aluminum alloy. Once again, a layer of the silicon slurry described in Example 1 was coated on the surface of each preform which was to be in contact with the molten metal. The atmosphere in the furnace was circulating air. The preforms (which were at room temperature) were added to the molten pool of aluminum alloy at a furnace temperature of approximately 700° C. At this temperature, an approximately ½ inch (13 mm) thick layer of NYAD ® −325 mesh (45 μm and smaller in diameter) wollastonite (NYCO, Willsboro, N.Y.) was sifted onto the exposed surfaces of the molten pool of aluminum alloy. This wollastonite layer also covered the exposed surfaces of the preforms. The furnace temperature was then raised from about 700° C. to about 980° C. over about a two hour period and maintained at about 980° C. for about 190 hours before being ramped to about 700° C. over about a two hour period. The preforms were removed from the surfaces of the molten pools of aluminum alloy at about 700° C. and examined by visual inspection. Both preforms were fully embedded by the oxidation reaction product of the molten aluminum alloy and air.

Subsequent runs were performed with larger preforms having dimensions of about 3½ inches (89 mm) by about 7 inches (178 mm) by about 2 inches (51 mm) thick. These runs utilized open cell (10 pores per inch) DBSC silicon carbide ceramic foam blocks and open cell (10 pores per inch) alumina (92% alumina by weight) ceramic foam blocks (both commercially available from Hi-Tech Ceramics, Inc., Alfred, N.Y.) underneath the preforms to support them during the oxidation reaction product growth process. These open cell ceramic foam blocks allowed the preforms to maintain contact with the molten aluminum alloy and also prevented the preforms from sinking below the surface of the molten pool of aluminum alloy. The open cell ceramic foam blocks successfully supported the preforms and allowed the preforms to be completely embedded by the oxidation reaction product of the molten aluminum alloy and the air atmosphere.

What is claimed is:

1. A method of continuously forming ceramic composite bodies which comprises:
   (a) forming more than one structure which comprises at least one internal cavity, and at least one wall which is permeable to a vapor-phase oxidant, wherein at least a portion of said cavity is defined by at least a portion of said at least one permeable wall;
   (b) providing at least one vapor-phase oxidant in at least a portion of said at least one internal cavity of each of said structures;
   (c) at least partially immersing said structures with a molten body of parent metal, wherein said parent metal comprises at least one metal selected from the group consisting of aluminum, silicon, titanium, tin, hafnium, and zirconium;
   (d) allowing said at least one vapor-phase oxidant to contact said molten parent metal through said at least one permeable wall;
   (e) reacting said molten parent metal with said at least one vapor-phase oxidant to form an oxidation reaction product which grows into at least a portion of said at least one internal cavity;
   (f) maintaining said molten body of parent metal at a temperature which is above the melting temperature of said parent metal but below the melting temperature of said oxidation reaction product and continuing said reaction so that said molten parent metal is progressively drawn through said oxidation reaction product towards said vapor-phase oxidant and into said at least one internal cavity so that fresh oxidation reaction product continues to form at the interface between said oxidant and previously formed oxidation reaction product, thereby forming a progressively thicker body of said oxidation reaction product to form at least one ceramic composite body;

(g) withdrawing said structures from said molten body of parent metal;

(h) recovering said at least one ceramic composite body from each of said structures; and (i) continuously repeating steps (b) through (h) with said structures to continuously produce ceramic composite bodies.

2. A method for producing self-supporting ceramic matrix composite bodies which comprises:

(a) providing a molten pool of parent metal with in a container, wherein said parent metal comprises at least one metal selected from the group consisting of aluminum, silicon, titanium, tin, hafnium, and zirconium;

(b) contacting at least one mass of filler material or at least one preform of filler material with the surface of said molten pool of parent metal at a first point;

(c) moving said at least one mass of filler material or said at least one preform of filler material across the surface of said molten pool of parent metal from said first point towards a second point;

(d) reacting molten parent metal from said molten pool of parent metal with an oxidant to form an oxidation reaction product which grown into and embeds at least a portion of said at least one mass of filler material or at least one preform of filler material as said at least one mass of filler material or said at least one preform of filler material moves towards said second point;

(e) maintaining said parent metal at a temperature higher than the melting temperature of said parent metal, but lower than the melting temperature of said oxidation reaction product, to form said oxidation reaction product, which product is in contact with, and extends between, said body of molten parent metal and said oxidant;

(f) continuing said reaction at said temperature so that said molten parent metal is progressively drawn through said oxidation reaction product towards said oxidant and into said at least one mass of filler material or said at least one preform of filler material so that fresh oxidation reaction product continues to form at the interface between said oxidant and previously formed oxidation reaction product, and thereby embedding with oxidation reaction product at least a portion of said at least one mass of filler material or said at least one preform of filler material, thereby forming said at least one ceramic matrix composite body;

(g) removing said at least one ceramic matrix composite body from the surface of said molten pool of parent metal;

(h) continuously repeating steps (b) through (h) with said at least one mass of filler material or said at least one preform to continuously produce ceramic matrix composite bodies.

3. The method of claim 1, wherein said at least one vapor-phase oxidant comprises at least one of an oxygen-containing gas, a nitrogen-containing gas, a halogen, methane, ethane, propane, acetylene, ethylene, propylene, $H_2/H_2O$, $CO/CO_2$, and mixtures thereof.

4. The method of claim 1, wherein said at least one oxidation reaction product comprises at least one of an oxide, a nitride, a carbide, a boride, an oxynitride and mixtures thereof.

5. The method of claim 1, wherein said at least one oxidation reaction product comprises at least one of aluminum oxide, aluminum nitride, silicon carbide, silicon boride, aluminum boride, titanium nitride, zirconium nitride, titanium boride, zirconium boride, titanium carbide, zirconium carbide, silicon nitride, hafnium boride, tin oxide, and mixtures thereof.

6. The method of claim 1, wherein said parent metal comprises aluminum and when said at least one vapor-phase oxidant comprises an oxygen-containing gas said oxidation reaction product comprises alumina or when said at least one vapor-phase oxidant comprises a nitrogen-containing gas said oxidation reaction product comprises aluminum nitride.

7. The method of claim 1, wherein said temperature comprises at least about 850° C.

8. The method of claim 1, wherein said aluminum further comprises at least one material selected from the group consisting of iron, silicon, copper, magnesium, manganese, chromium, zinc, germanium, tin, lead, sodium, lithium, calcium, boron, phosphorus, yttrium, cerium lanthanum, praseodymium, neodymium and samarium.

9. The method of claim 1, wherein said parent metal comprises silicon and said at least one oxidation reaction product comprises silicon nitride.

10. The method of claim 2, wherein said at least one oxidant comprises at least one material selected from the group consisting of oxygen, nitrogen, a halogen, sulfur, phosphorus, arsenic, carbon, boron, selenium, tellurium, methane, ethane, propane, acetylene, ethylene, propylene, $H_2/H_2O$, $CO/CO_2$ and mixtures thereof.

11. The method of claim 2, wherein said oxidation reaction product comprises at least one of an oxide, nitride, carbide, boride, oxynitride, and mixtures thereof.

12. The method of claim 2, wherein said oxidation reaction product comprises at least one of aluminum oxide, aluminum nitride, silicon carbide, silicon boride, aluminum boride, titanium nitride, zirconium nitride, titanium boride, zirconium boride, titanium carbide, zirconium carbide, silicon nitride, hafnium carbide, tin oxide, and mixtures thereof.

13. The method of claim 2, wherein said at least one mass of filler material or at least one preform of filler material comprises at least one material selected from the group consisting of powders, flakes, platelets, microspheres, whiskers, bubbles, fibers, chopped fibers, particulates, spheres, fiber mats, and mixtures thereof.

14. The method of claim 2, wherein said at least one mass of filler material or at least one preform of filler material comprises at least one material selected from the group consisting of ceramic fillers, reactive fillers, ceramic-coated fillers, metal fillers, and mixtures thereof.

15. The method of claim 2, wherein said parent metal comprises aluminum and said at least one oxidant comprises an oxygen-containing gas and said oxidation reaction product comprises alumina or when said at least one oxidant comprises a nitrogen-containing gas said oxidation reaction product comprises aluminum nitride.

16. The method of claim 2, wherein said parent metal comprises silicon and said oxidation reaction product comprises silicon nitride.

17. The method of claim 15, further comprising providing at least one barrier material to at least a portion of said at least one mass of filler or at least one preform of filler material, said at least one barrier means comprising at least one material selected from the group consisting of calcium sulfate, calcium silicate, calcium phosphate, calcium aluminate, calcium carbonate, and mixtures thereof.

18. The method of claim 15, wherein said temperature comprises at least 850° C.

19. The method of claim 15, wherein said aluminum further comprises at least one material selected from the group consisting of iron, silicon, copper, magnesium, manganese, chromium, zinc, germanium, tin, lead, sodium, lithium, calcium, boron, phosphorus, yttrium, cerium, lanthanum, praseodymium, neodymium and samarium.

20. The method of claim 2, wherein said parent metal comprises at least one metal selected from the group consisting of aluminum and silicon.

* * * * *